(12) United States Patent
Vornehm et al.

(10) Patent No.: US 7,311,629 B2
(45) Date of Patent: Dec. 25, 2007

(54) TRANSMISSION WITH A STEPLESSLY ADJUSTABLE TRANSMISSION RATIO, WITH OR WITHOUT BRANCHED POWER AND WITH OR WITHOUT AN ELECTRICAL MACHINE

(75) Inventors: Martin Vornehm, Bühl (DE); Christian Lauinger, Baden-Baden (DE); Hartmut Faust, Bühl (DE); Michael Reuschel, Ottersweier (DE)

(73) Assignee: LuK Lamellen und Kupplungsbau Beteiligungs KG, Bühl (DE)

( * ) Notice: Subject to any disclaimer, the term of this patent is extended or adjusted under 35 U.S.C. 154(b) by 299 days.

(21) Appl. No.: 10/744,945

(22) Filed: Dec. 22, 2003

(65) Prior Publication Data

US 2004/0224811 A1 Nov. 11, 2004

(30) Foreign Application Priority Data

Dec. 23, 2002 (DE) ................................ 102 60 865
Feb. 3, 2003 (DE) ................................ 103 04 128

(51) Int. Cl.
*F16H 37/02* (2006.01)
(52) U.S. Cl. ...................... 475/210; 475/198; 475/207; 475/214; 74/665 B; 74/665 P
(58) Field of Classification Search ................ 475/207, 475/210, 213, 214, 198; 74/665 B, 665 P
See application file for complete search history.

(56) References Cited

U.S. PATENT DOCUMENTS

| 5,045,028 | A | * | 9/1991 | Rattunde et al. | .............. | 474/17 |
|---|---|---|---|---|---|---|
| 5,643,131 | A | * | 7/1997 | Kuhn et al. | .................. | 475/210 |
| 5,720,686 | A | * | 2/1998 | Yan et al. | .................... | 475/211 |
| 6,056,661 | A | * | 5/2000 | Schmidt | ...................... | 475/210 |
| 6,293,888 | B1 | * | 9/2001 | Moon | .......................... | 475/210 |
| 6,447,422 | B1 | * | 9/2002 | Haka | ........................... | 475/211 |
| 6,566,826 | B2 | * | 5/2003 | Imai et al. | .................... | 318/11 |
| 2004/0082421 | A1 | * | 4/2004 | Wafzig | ....................... | 475/207 |

* cited by examiner

*Primary Examiner*—David D. Le
(74) *Attorney, Agent, or Firm*—Alfred J. Mangels

(57) ABSTRACT

A branched power transmission having several transmission ratio ranges with a steplessly adjustable transmission ratio. A drive shaft is connected to both shafts of a variable speed unit through a distributor transmission, which shafts in turn are connected with the input shafts of a parallel gearbox through respective clutches. Two transmission ratio ranges differ from each other through the transmission ratio of an input shaft of the parallel gearbox and its output shaft. Additionally, the power-producing transmission can include an electrical machine. A further embodiment includes a variable speed unit, a first planetary transmission connected with a drive shaft, the input shaft of the variable speed unit and a connecting shaft, and a second planetary transmission that is connected with the connecting shaft of the output shaft of the variable speed unit and an output shaft, and an electrical machine that is non-rotatably connected with the connecting shaft.

13 Claims, 12 Drawing Sheets

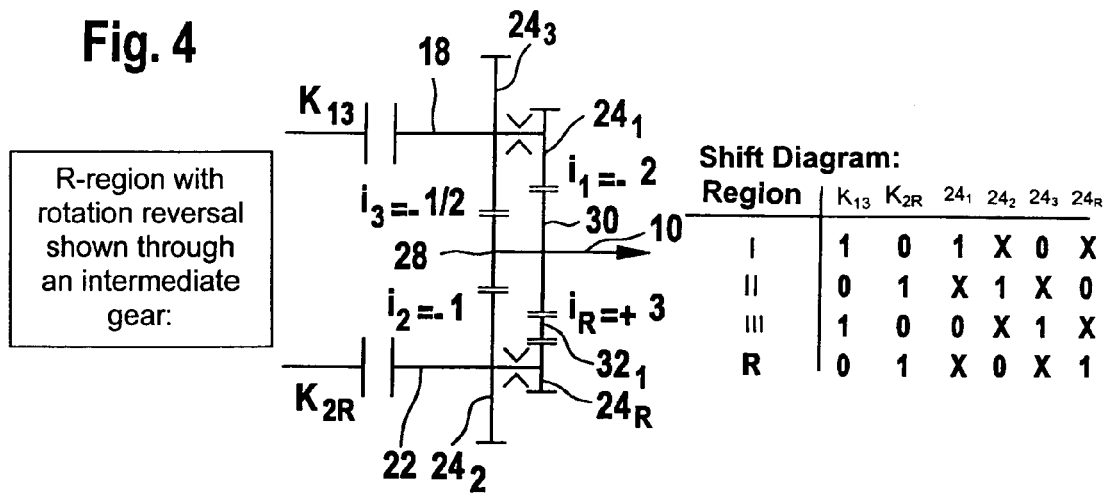
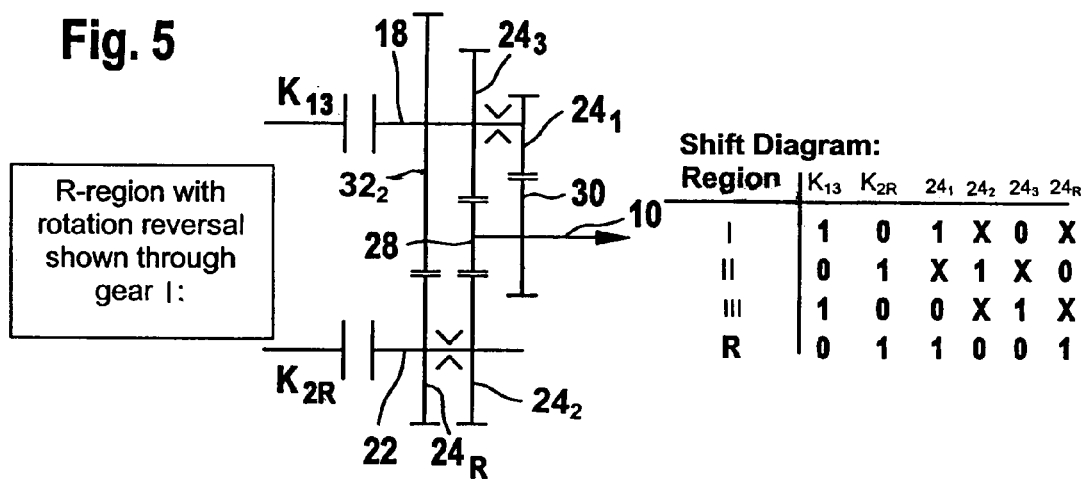
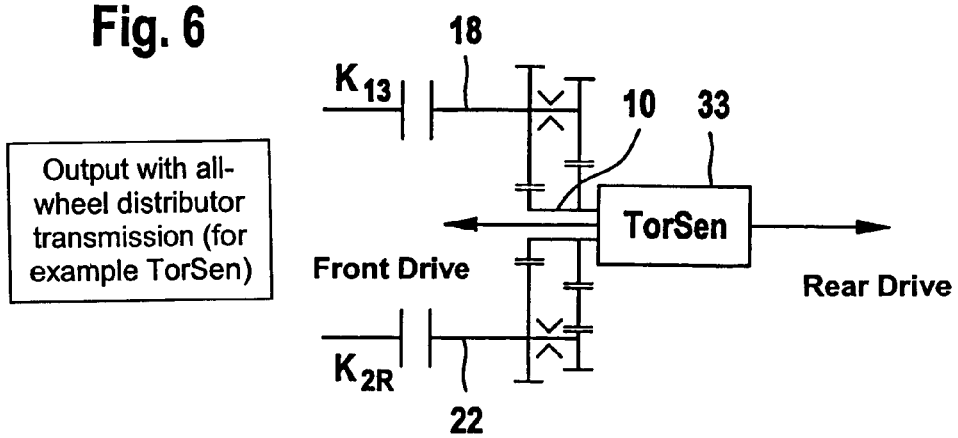

Shift Diagram:

| Region | $K_{13}$ | $K_{2R}$ | $24_1$ | $24_2$ | ... | KB |
|---|---|---|---|---|---|---|
| I | 1 | 0 | 1 | X | ... | 1 |
| IE/GN | 1 | 0 | 1 | X | ... | 0 |
| II | 0 | 1 | X | 1 | ... | 1 |
| IIE | 0 | 1 | X | 1 | ... | 0 |
| I-IIE | 1 | 1 | 1 | 1 | ... | 0 |
| ... | | | | | | |

Shift Diagram:

| Region | $K_{13}$ | $K_{2R}$ | $24_1$ | $24_2$ | ... | KB |
|---|---|---|---|---|---|---|
| I | 1 | 0 | 1 | X | ... | 1 |
| IE/GN | 1 | 0 | 1 | X | ... | 0 |
| II | 0 | 1 | X | 1 | ... | 1 |
| IIE | 0 | 1 | X | 1 | ... | 0 |
| ... | | | | | | |

TRANSMISSION WITH A STEPLESSLY ADJUSTABLE TRANSMISSION RATIO, WITH OR WITHOUT BRANCHED POWER AND WITH OR WITHOUT AN ELECTRICAL MACHINE

BACKGROUND OF THE INVENTION

1. Field of the Invention

The invention concerns a branched power transmission with several transmission ratio ranges and with a steplessly adjustable transmission ratio, as well as a parallel gearbox, especially for use in such a transmission. The invention further concerns a method for operating a branched power transmission. Additionally, the invention concerns a method for controlling the contact pressure or the contact force between the conical disks and the endless torque-transmitting means of a variable speed unit in such a branched power transmission. The invention further concerns such a transmission that additionally contains an electrical machine. Furthermore, the invention also concerns a method for the low-loss production of an output torque of the transmission when a motor vehicle is stationary as well as a method for operating a transmission with a steplessly variable transmission ratio and an electrical machine.

2. Description of the Related Art

Automatic transmissions with continuously adjustable transmission ratios are gaining increasing interest in motor vehicles not only because of the high driving comfort, but also because of the lower fuel consumption in comparison to conventional automatic transmissions that operate with planetary gear sets. Such transmissions contain, for example, a variable speed unit that is formed by two conical disk pairs enwrapped by an endless torque-transmitting means, wherein the spacing between the conical disks of the conical disk pairs is adjustable in opposite directions for adjusting the transmission ratio.

One problem with variable speed units lies in their limited transmission ratio adjustment range as well as in their limited torque transmitting capability. In order to enlarge the gear spread, meaning the transmission ratio adjustment range, and the torque transmitting capability, branched power automatic transmissions were produced in which the variable speed unit can be connected in various ways with a gear transmission through at least one clutch, wherein the adjustment range of the variable speed unit traverses is carried out during the change of the transmission ratio of the overall transmission in one direction or the other in accordance with the clutch position, so that an enlarged gear spread results in that case by a reduced variable speed unit spread. Further, at least in a branched power transmission in which a part of the drive torque is transmitted parallel to the variable speed unit through a clutch directly to the gear transmission or the output, the variable speed unit does not have to transmit the entire drive torque, whereby the torque transmitting capability of the transmission is enlarged.

FIG. 1 shows the basic structure of a first embodiment of a known branched power transmission.

The drive torque originating from an engine that is not shown and that is transmitted by a input shaft 2 is transmitted on the one hand directly to a variable speed unit 4 and on the other hand to a gear transmission 8 constructed as a summing transmission or a coupling transmission through a clutch 6, of which one input is connected with the output of the variable speed unit 4 and whose output is constituted by an output shaft 10, by which the motor vehicle is driven. One characteristic of the branched power transmission with the basic structure in accordance with FIG. 1 is that the variable speed unit 4 must transmit the full engine torque in the non-split region (clutch 6 disengaged) and must, therefore, be correspondingly designed for high torques and high rotational speeds, which means expense. Known branched power transmissions of that structure have a maximum spread of 7 and a torque transmitting capability of about 500 Nm.

A modified basic structure of a branched power transmission is shown in FIG. 2. In that structure, an input shaft 2 directly drives an input-side distributor transmission 12, for example a planetary transmission that has two outputs, one of which is connected with a variable speed unit 4 and the other is connected through a clutch 6 with the output shaft 10 which is non-rotatably engaged with the output of variable speed unit 4. Also in this embodiment, variable speed unit 4 must transmit the entire engine power when clutch 6 is disengaged.

SUMMARY OF THE INVENTION

The invention is based on the problem of expanding the possibilities of transmissions with steplessly adjustable transmission ratios.

A first solution of that problem is achieved with a branched power transmission with several transmission ratio ranges with steplessly adjustable transmission ratios and that contains an input shaft non-rotatably connected with an engine whose input shaft is connected with both shafts of a variable speed unit through a distributor transmission and a parallel gearbox whose input shafts can be coupled with each shaft of the variable speed unit through respective clutches, and whose output shafts form the output shaft of the branched power transmission, wherein at least two transmission ratio ranges differ from each other only by the transmission ratio between the input shaft of the parallel gearbox and its output shaft.

The transmission in accordance with the invention has several transmission ratio ranges through the integration of a known parallel gearbox (often also called a double clutch transmission) that enables an optimal layout and that allows for the relief of the variable speed unit. The torque transmission capability of the transmission can be increased, for example, from a variable speed unit capacity of 300 Nm to more than 500 Nm. The operation of the transmission in accordance with the invention takes place by the control of the variable speed unit transmission ratio, the two clutches, and the known switching of the gears of the parallel gearbox that is possible by a jaw clutch that can be operated in an uncomplicated manner.

The distributor transmission advantageously contains a planetary transmission.

Transmission ratio ranges I and III can advantageously be shifted through the engagement of one clutch and the change of the gear engaged between one of the input shafts of the parallel gearbox and its output shaft, and transmission ratio ranges II and R can be shifted through the engagement of the other clutch and the change of the gear engaged between the other of the input shafts of the parallel gearbox and its output shaft. An enlargement to still more transmission ratio ranges is possible through the enlargement of the parallel gearbox.

Advantageously, the output shaft of the parallel gearbox has one gear for the transmission ratio ranges I and R and/or II and III. The number of components in the transmission will thereby be reduced.

An additional transmission ratio of the number of different components or gears can be achieved if the parallel gearbox is constructed with reciprocal transmission ratios, especially with values such as 2, 1, or ½ because it results in a good match of the variable speed unit spread.

The shift actuator of the parallel gearbox is preferably constructed as a controller drum actuating all shift sleeves of the parallel gearbox, or as a rotary slide actuator.

It is further advantageous to design the planetary transmission as a positive transmission without a ring gear, or to design the planet carrier itself as a gear with external teeth.

A parallel gearbox, as it can be advantageously utilized in one of the above-mentioned transmissions, has two input shafts that are each selectively driveable through a clutch, which in each case are movable into rotational engagement with an output shaft through at least one gear set, wherein a reverse gear is thereby formed that is arranged between an intermediate gear and a gear non-rotatably connected with the output shaft.

In a further embodiment of parallel gearbox, a reverse gear is formed in that the parallel gearbox has two input shafts that are each selectively driveable through a clutch, which in each case are movable into rotational engagement with an output shaft through at least one gear set, wherein a reverse gear is formed through a gear that is non-rotatably connected with the driven input shaft through the associated clutch and that meshes with an additional gear that is non-rotatably connected with the other input shaft, which other input shaft is non-rotatably connected with the output shaft through a set of forward gears.

During the operation of the branched power transmission, a new transmission ratio range is advantageously engaged through the shifting of the parallel gearbox long before the corresponding clutch changeover is made.

Further, it is appropriate to have both clutches disengaged and have the transmission ratio ranges I and R engaged when the motor vehicle is standing still and the transmission selection lever is in the neutral position. One can immediately start driving in the correct direction by engaging a clutch.

In order to control the contact pressure between the conical disks and the endless torque-transmitting means in a variable speed unit, the torque transmitted by the endless torque-transmitting means is often used. That torque is reversed in such branched power transmissions with several transmission ratio ranges by a changeover between the transmission ratio ranges, so that the use of a torque sensor that controls the contact pressure with a more or less wide opening of a control valve, as a function of the torque, encounters difficulties runs and can have an adverse effect on comfort at the shifting point based on its transition slack.

In accordance with the invention a branched power transmission with an continuously variable transmission ratio is produced with several transmission ratio ranges that contains an input shaft for non-rotatable connection with an engine, which input shaft is connected with both shafts of a variable speed unit through a distributor transmission, at least two clutches with which one each of the shafts of the variable speed unit can be coupled through a transmission with an output shaft of the branched power transmission, and a torque sensor unit for detecting the effective torque on the input shaft or on one the shafts connected with the distributor transmission and for controlling an effective basic contact pressure on at least at one displaceable disk of the variable speed unit.

In that way a basic contact pressure dependent on the input torque can be produced by a torque sensor device of a known structure.

It is further advantageous to provide a method for controlling the contact pressures between the conical disks and the endless torque-transmitting means of a variable speed unit in a branched power transmission with several transmission ratio ranges having steplessly adjustable transmission ratios, by which method the effective torque at the input shaft of the branched power transmission is measured, and at least one contact pressure corresponding to the effective torque is controlled.

The above-mentioned method is advantageously carried out in such a way that the basic contact pressure is detected and is utilized for controlling further pressures that contribute to the necessary total contact pressure.

In a further method in accordance with the invention, the basic contact pressure is detected and is utilized for the control or regulation of the pressures on the clutches provided for the shift between the transmission ratio ranges.

It is advantageous in many respects when a branched power transmission as described above additionally contains an electrical drive/generator machine and an additional clutch. The clutch can serve, for example, to block a further planetary transmission with which a component the electrical machine is non-rotatably connected, wherein the electrical machine is non-rotatably connected with the transmission structure in which the electrical machine is operated its blocked condition, and in the unblocked condition the overall transmission has an enlarged operating region. The clutch can also be used only to terminate the power division at the time a non-rotatable connection is opened.

The additional electrical machine allows for numerous additional operating conditions depending upon the control of the electrical machine and the blockage clutch. For example, the power losses in standing motor vehicles in which a creeping effect is desired can be reduced.

In an advantageous method for operating such a branched power transmission, the drive engine of a vehicle at standstill drives the electrical machine through the branched power transmission, through which electrical power is produced, and the friction clutches of the transmission, the transmission ratio of the variable speed unit, as well as the electrical machine are controlled in such a way that a torque originates at the transmission output wherein the friction power of the clutches is smaller than the generator power of the motor. The torque produced in such a way at the transmission output is clearly the carrier Torque of the transmission's transmission ratio between the internal combustion engine and the generator. That torque at the transmission output can therefore ideally be produced without frictional slippage at a starting clutch and can be utilized for starting.

An additional solution to the object in accordance with the invention can be achieved with a transmission with a steplessly variable transmission ratio that contains: a variable speed unit with an input shaft and an output shaft, whose transmission ratio is steplessly adjustable, a first planetary transmission that is connected with an input shaft, the input shaft of the variable speed unit and a connecting shaft, a secondary planetary transmission that is connected with the connecting shaft, the output shaft of the variable speed unit, and an output shaft, and an electrical machine that is non-rotatably connected with the connecting shaft.

An important feature of the transmission structure in accordance with the invention is that the variable speed unit, which can be designed, for example, as a belt-driven, conical pulley transmission or as a friction wheel transmission, and the electrical machine, which advantageously is operable as a motor or as a generator, is arranged "within the transmission".

The drive shaft can advantageously be coupled through a clutch with the first planetary transmission and through another clutch with the input shaft of the variable speed unit.

In an advantageous configuration of the transmission in accordance with the invention, the ring gear of the first planetary transmission is connected with the clutch, and the sun gear is connected with the input shaft, and the planet carrier is connected with the connecting shaft, and in the second planetary transmission the planet carrier is connected with the connecting shaft, the sun gear is connected with the output shaft, and the ring gear is connected with the output drive shaft.

In an alternative advantageous configuration of the transmission in accordance with the invention, in the first planetary transmission the planet carrier is connected with the drive shaft, the sun gear is connected with the input shaft, and the ring gear is connected with the connecting shaft, and the second planetary transmission the planet carrier is connected with the output shaft, the sun gear is connected with the output shaft of the variable speed unit, and the ring gear is connected with the connecting shaft. This transmission represents an enlargement of the structure in accordance with the invention illustrated in FIG. 3 when a second planetary transmission is introduced.

Preferably, the transmission contains preferably a brake with which the rotor of the electrical machine can be securely braked.

The transmission in accordance with the invention allows a plurality of operating conditions and can be controlled with a number of methods.

In one advantageous method for operating a transmission in accordance with the invention, a branched power operating range is formed by the simultaneous engagement of both clutches.

Advantageously, with a rotationally driven drive shaft and a stationary output shaft a creeping torque is introduced through the control of the brake and/or the control of a generator torque of the electrical machine.

The variable speed unit can be adjusted to provide a controlled creeping torque with a stationary motor vehicle by the brake and/or the generator torque of the electrical machine.

In the transmission according the invention, the transmission ratio of the variable speed unit can be adjusted in such a way that the transmission ratio of the transmission is independent of the rotational speed of the connecting shaft and that the rotational speed of the connecting shaft is regulated by the electrical machine in such a way that the variable speed unit rotates within a range to reduce damage to the endless torque-transmitting means.

Further, it is possible to increase the spread of the variable speed unit through the control of the rotational speed of the electrical machine.

When the transmission has at least one additional clutch for shifting between two transmission ratio ranges, the shift between the transmission ratio ranges can advantageously occur by controlling the rotational speed of the electrical machine.

It is possible with the transmission in accordance with the invention to control the rotational speed of the electrical machine during slowdown operation of the transmission by adjusting the transmission ratio of the variable speed unit and thereby to store in the form of electrical energy with good efficiency the released mechanical energy caused by applying the brakes of the motor vehicle.

The startup of a drive engine for driving the input shaft of the transmission in accordance with the invention can occur by means of the electrical machine, wherein it is coupled to the transmission after its startup of the drive motor. By the structures shown in FIGS. 12 to 14 or 23, the coupling occurs through the actuation of clutch KB.

Advantageously, when the drive engine is not yet running the electrical machine operates a hydraulic pump to supply the appropriate systems of the motor vehicle power train.

BRIEF DESCRIPTION OF THE DRAWINGS

The invention will be explained below as examples and with further details with the help of schematic drawings.

The drawings show.

DESCRIPTION OF THE PREFERRED EMBODIMENTS

Figure 3:
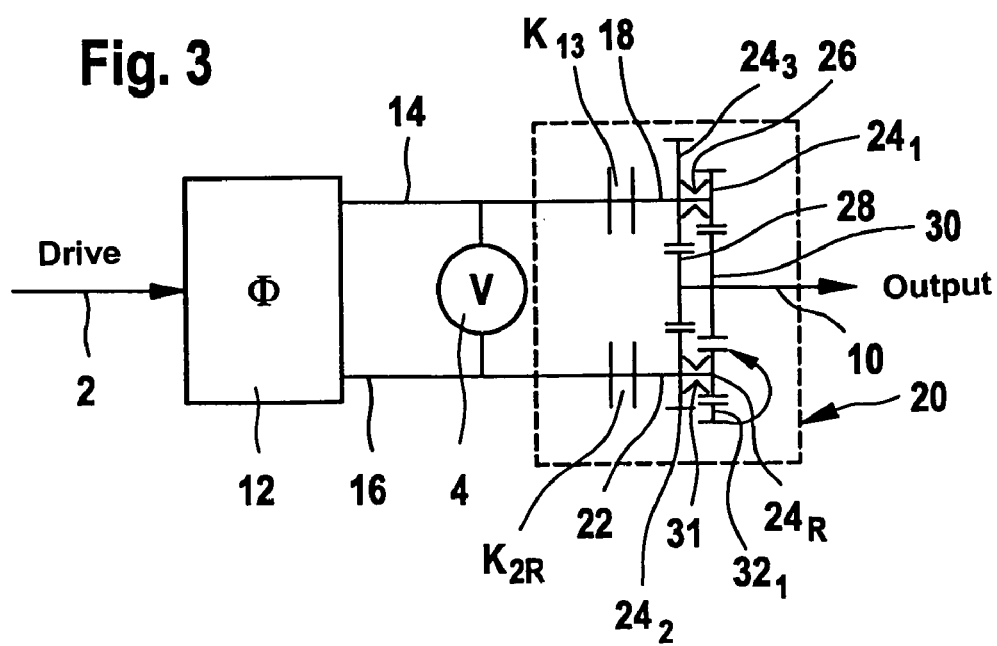

In accordance with FIG. 3 a branched power transmission is formed with an input shaft of a distribution transmission 12 that is connected to a drive shaft 2 connected to a drive engine that is not shown, whose output shafts are non-rotatably connected with shafts 14 and 16 of a variable speed unit 4. The shaft 14 of the variable speed unit 4 is connected through a clutch $K_{13}$ with an input shaft 18 of a parallel gearbox 20. The shaft 16 is connected through an additional clutch $K_{2R}$ with an additional input shaft 22 of the parallel gearbox.

Two gears $24_3$ and $24_1$ are arranged on the input shaft 18 of the parallel gearbox, which is also called a double-clutch transmission. The gears $24_3$ and $24_1$ are engaged through a shift mechanism 26 in a known way with respective ones of the gears 28 and 30 in such a way that a non-rotatable connection exists between the shaft 18 and the output shaft 10.

In a similar way, gears $24_2$ and $24_R$ are arranged on the input shaft 22 and are engaged through a known shift mechanism 31 with respective ones of both gears 28 and 30 in such a way that a non-rotatable connection exists between the input shaft 22 and the output shaft 10.

In the illustrated example, a transmission ratio step I is connected with a non-rotatable coupling between the input shaft 18 and the output shaft 10 through the gears $24_1$ and 30, a transmission ratio step II is connected by a coupling through the gears $24_2$ and 28, a transmission ratio step III is connected by a coupling through the gears $24_3$ and 28, and a reverse travel step R is connected by the coupling through the gears $24_R$ and 30, by which an intermediate gear is operative in a known way. One of the transmission ratio ranges I or III is activated with an engaged clutch $K_{13}$, and one of the transmission ratio ranges II or R is activated with an engaged clutch $K_{2R}$.

The shift mechanisms 26 and 31 can be formed in a simple way as a claw switch, or possibly by synchronizers. For operation known actuators can be used, for example a drum actuator that from a rotational movement produces the sliding movements of both shift claws or sliding sleeves of the shift mechanisms 26 and 32.

As can be seen, the gears 28 and 30 are each used in two transmission ratio steps whereby a simple construction of the parallel gearbox is provided. For further reduction of the variety of gears, it is possible to design the transmission ratio steps I and III with reciprocal or reciprocal value transmission ratios.

The reverse gear can be designed with a very short transmission ratio.

There exist various possibilities for the necessary rotational speed reversal for the reverse transmission ratio range R, of which two will be explained with the help of FIGS. 4 and 5.

In the embodiment in accordance with FIG. 4, an intermediate shaft or an intermediate gear $32_1$ is arranged between the gear $24_R$ and the gear 30 that is non-rotatably connected with the output shaft 10, through which the reversal of the rotational direction of the output shaft 10 takes place by the non-rotatable coupling of gear $24_R$ with the input shaft 22. This embodiment is also shown schematically in FIG. 3.

The shift diagram provided in FIG. 4 shows the shift conditions of the clutches $K_{13}$ and $K_{2R}$ as well as the coupling of the respective gears $24_1$, $24_2$, $24_3$, and $24_R$ with their associated shafts for the individual transmission ratio ranges I, II, III, and R, wherein 1 designates the coupled condition, 0 the uncoupled condition, and X that it is immaterial which coupling condition exists.

FIG. 5 shows a further possibility for the rotational speed reversal for travel in reverse. In the embodiment in accordance with FIG. 5, an additional gear $32_2$ that meshes with reverse gear $24_R$ is non-rotatably connected with the input shaft 18. As the shift diagram in FIG. 5 shows, the clutch $K_{2R}$ is engaged when the reverse gear step is engaged, so that the input shaft 18, with clutch $K_{13}$ disengaged, is rotatably driven by the additional gear $32_2$ and through the engaged first gear (gear $24_1$), and the gear 30 non-rotatably connected with the output shaft 10, is driven in a reverse rotation direction relative to forward travel. It should be understood that another gear set can also be operated.

FIG. 6 shows a parallel gearbox in accordance with FIG. 4 in its application for an all-wheel drive, wherein the design of the reverse gear corresponds with that of FIG. 4. The output shaft 10 is of hollow construction and forms the input shaft for a differential 33, for example a Torsen® differential, whose output shafts lead to the front wheels and the rear wheels, wherein for space considerations the output shaft leading to the front wheels advantageously is led through the hollow output shaft 10.

Figure 7:
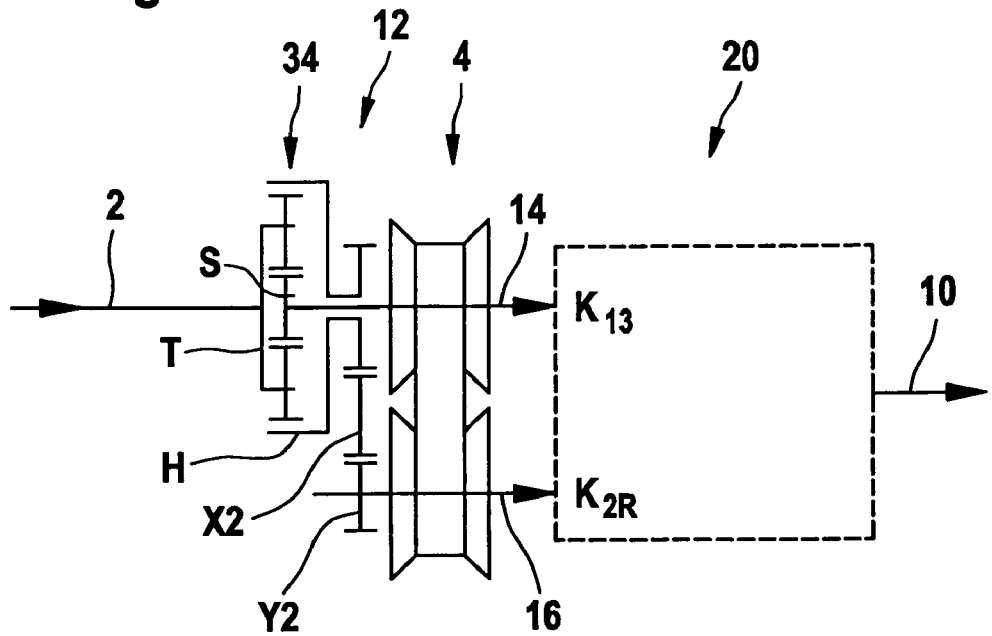

FIG. 7 shows an exemplary embodiment of the distributor transmission 12 with a following variable speed unit 4 in the form of a belt-driven conical pulley transmission and a parallel gearbox 20.

The input shaft 2 is non-rotatably connected with the carrier T of a planetary stage 34 whose planet gears mesh with the sun gear S, which is non-rotatably connected with the shaft 14 of the variable speed unit 4. The ring gear H of the planetary stage 34 is connected in torque-transmitting engagement with a further gear Y2, that is non-rotatably connected with the shaft 16 of the variable speed unit 4, through a gear X2 and an intermediate gear. The planetary transmission ratio amounts to, for example, −1.5 and the transmission ratio between the ring gear and Y2 amounts to +0.7. The transmission ratios of the parallel gearbox 20 that is controlled through the clutch $K_{13}$ amount to −0.5 and −2; the transmission ratios controlled through the clutch $K_{2R}$ are −1 or +3. A total spread of 8.1 (0.91 to 7.44) can be achieved with the described structure with a variable speed unit spread of 4 (0.5 to 2), which is adaptable to a differential (not shown) of a particular motor vehicle. The maximum rotational speed that appears on the driving side of variable speed unit 4 amounts to 42% of the maximum engine torque. The maximum rotational speed of the disk pairs of the variable speed unit amount to about 163% of the engine rotational speed. By increasing the variable speed unit spread to 6 (0.4 to 2.4) the same transmission structure delivers a total spread of 10.1.

Figure 8:
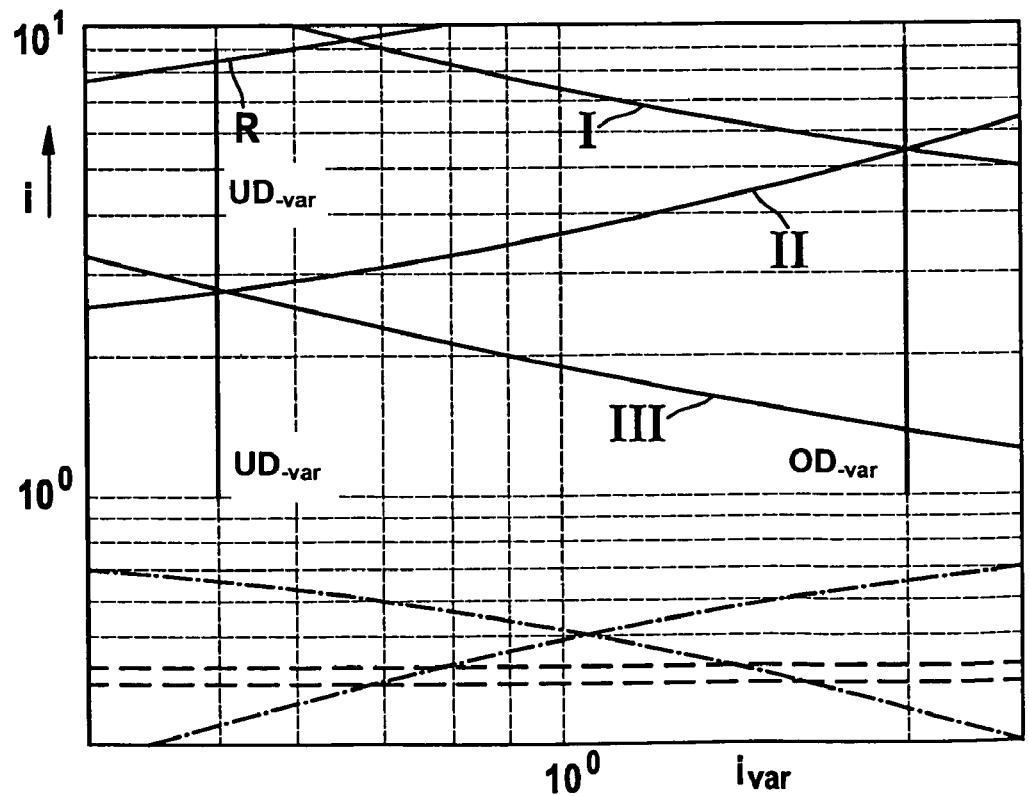

In FIG. 8, the curves R, I, II, and III illustrate the transmission ratio i of the overall transmission (ordinate) as a function of the respective transmission ratio of the variable speed unit $i_{var}$ (abscissa) for the transmission ratio ranges R (reverse), I, II, and III. At the transmission ratios $UD_{-var}$ and $OD_{-var}$ the shifts between the ranges occur through the shifting of the respective clutches $K_{13}$ and $K_{2R}$, whereby the respective transmission ratio steps in the parallel gearbox are in each case previously engaged.

The dashed horizontal straight lines designate the pulling torques on the variable speed unit drawn from the engine torque that amount to 42% in the ranges I and III and 40% in the ranges R and II.

The dot-and dash curves indicate the variable speed unit power drawn from the engine power and amount to a maximum of 70% in the drive stages 1 and 3 or a maximum of 73% in the drive stages 2 and 3. The average power amounts to about 50% of the engine power.

Very high torques can be transmitted in the described transmission in the current state of the art with an allowable variable speed unit torque of about 400 Nm and at an engine torque of approximately 800 Nm.

Figure 1:
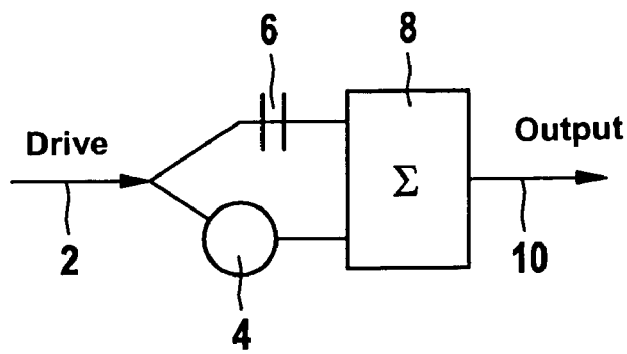
FIG. 1 a basic structure of a known branched power transmission.
Figure 2:
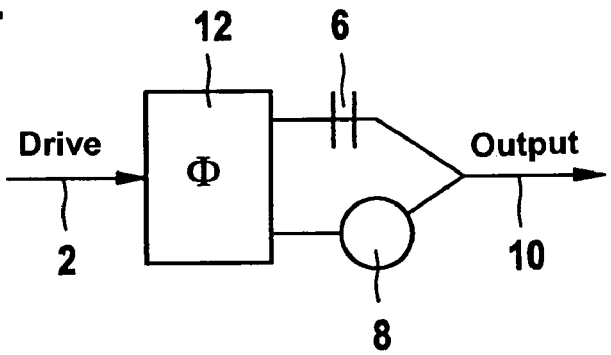
FIG. 2 a basic structure of a further embodiment of a known branched power transmission, FIG. 3 an example of a basic structure of a transmission in accordance with the invention, FIGS. 4 and 5 two examples for rotational speed reversal in the reverse gear of a parallel gearbox, FIG. 6 a parallel gearbox for an all-wheel drive, FIG. 7 an example of the structure of a distributor transmission contained in a transmission in accordance with FIG. 3, FIG. 8 a graph for explaining the functioning of the transmission in accordance with FIG. 7, FIG. 9 a modified embodiment of a distributor transmission, FIG. 10 a cross-sectional view of a portion through a transmission with an integrated torque sensor, FIG. 11 a flow diagram for explaining the hydraulic control of a variable speed unit, FIG. 12 to 14 Illustrate structures of steplessly adjustable transmissions with power division and parallel gearboxes at the output end with an additional electrical machine, FIG. 15 a flow diagram for explaining the control of a transmission in accordance with FIGS. 12-14 and 23, FIG. 16 the structure of a transmission in accordance with the invention together with elements of its control unit, FIG. 17 a spherical diagram for explaining the degrees of freedom and the functioning of the transmission in accordance with the invention, FIG. 18 a spherical diagram for an exemplary transmission structure that shows the required transmission ratio of the variable speed unit, FIG. 19 a spherical diagram for explaining different operating modes of the transmission, FIG. 20 a spherical diagram for explaining further characteristics of the transmission, FIG. 21 two examples of transmission structures in which the electrical machine can be non-rotatably connected with the connecting shaft with switchable transmission ratios, FIG. 22 a simplified structure in which the planetary gearset can be eliminated.

In a further advantageous structure, the drive shaft 2, connected with a distributor transmission 12 that is equipped with a planetary stage, is non-rotatably connected with the shaft 14 of the variable speed unit 4 through the ring gear and the sun gear and is non-rotatably connected with the shaft 16 through the carrier and two gears. The transmission ratio of the planetary transmission then advantageously amounts to −2.5 and the transmission ratio of the gear stage amounts to −0.3. The transmission ratios of the parallel gearbox could be designed as described in detail in FIG. 2. Such a transmission has the advantage that the transmission ratio X2/Y2 can be designed without an intermediate gear (fixed to the gear connected to the ring gear H, as shown in the embodiment in accordance with FIG. 7).

Figure 9:
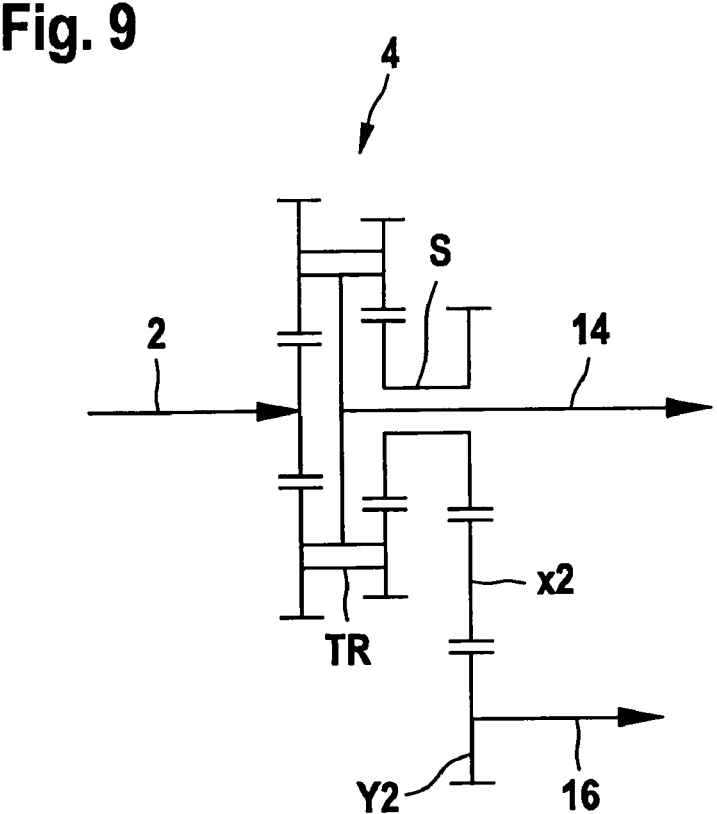

An additional advantageous embodiment of the distributor transmission is shown in FIG. 9. In that embodiment, the input shaft 2 is coupled with the shaft 14 through a carrier TR that is provided with two gear sets, and is also coupled with the sun gear S through the carrier TR, which is coupled with the shaft 16 through the gears X2 and Y2. In that embodiment the planetary transmission ratio amounts to, for example, 1.7 and the gear ratio X2/Y2 to 0.7. The planetary transmission is a positive transmission that can be designed constructively as a transmission without a ring gear, which could be advantageous relative to the structural space, as the structural space is a long cylinder with a small diameter.

In a further embodiment of the distributor transmission 4, the input shaft 2 is coupled with the shaft 14 through the ring gear and the sun gear of the planetary set and is coupled with the shaft 16 through the carrier and a gear stage X2, Y2. The planetary transmission ratio then advantageously amounts to 2.5 and the gear ratio X2/Y2 to +0.7. The planetary transmission is also a positive transmission, whereby it serves as an option whose carrier itself forms a gear with external teeth (for the transmission ratio X2/Y2).

In a once again modified, also not shown, embodiment of the distributor transmission, the input shaft 2 is connected with the shaft 14 through the sun gear and the carrier of the planetary stage, and is connected with the shaft 16 through the ring gear and a transmission ratio stage X2/Y2. The planetary transmission ratio then advantageously amounts to +1.4; the transmission ratio of the gear stage amounts to −0.3. The planetary transmission in this embodiment is also a positive transmission, and the transmission ratio X2/Y2 can, in turn, be designed without an intermediate gear. A characteristic feature of this embodiment lies in that the fixed disk of the variable speed unit 4 is directly utilized as a planetary carrier. Based upon the torque direction, increased contact pressure is nevertheless necessary.

The clutches $K_{13}$ and $K_{2R}$ are advantageously disengaged in a condition without pressure, so that with an open hand brake towing of the motor vehicle is possible.

Further, it is possible with the transmission in accordance with the invention to steplessly and comfortably change the transmission ratio within a range with the help of the variable speed unit. A "sporty" stepwise transmission ratio change is also possible, for example with a kick-down actuation with the help of the clutches.

The clutches can advantageously be operated with controlled slippage, for example in order to intercept torque jolts or to increase comfort by isolating vibrations.

It is common to all of the described embodiments of branched power transmissions with a continuously variable transmission ratio have in common that a sufficient contact pressure between the components in opposite frictional engagement must be ensured to transmit torque. It is known to ensure sufficient contact pressure in belt-driven conical pulley transmissions through a torque sensor or through a controlled contact pressure, by which the necessary pressure is produced with an electronic control unit through electromagnetic valves. A problem lies in the fluctuating quality of the torque signal, which can cause insufficient contact pressure that is critical for the functional efficiency and the durability of the variable speed unit. The use of a torque sensor to ensure the contact pressure is difficult in a variable speed unit used in a branched power transmission because the torque operating on the variable speed unit changes sign at each shift point between the transmission ratio ranges (shifting between the clutches). That means that a torque sensor with the appropriate play must change from the pull to the push side whereby a satisfactory shift comfort could only be achieved with additional expense.

Figure 10:
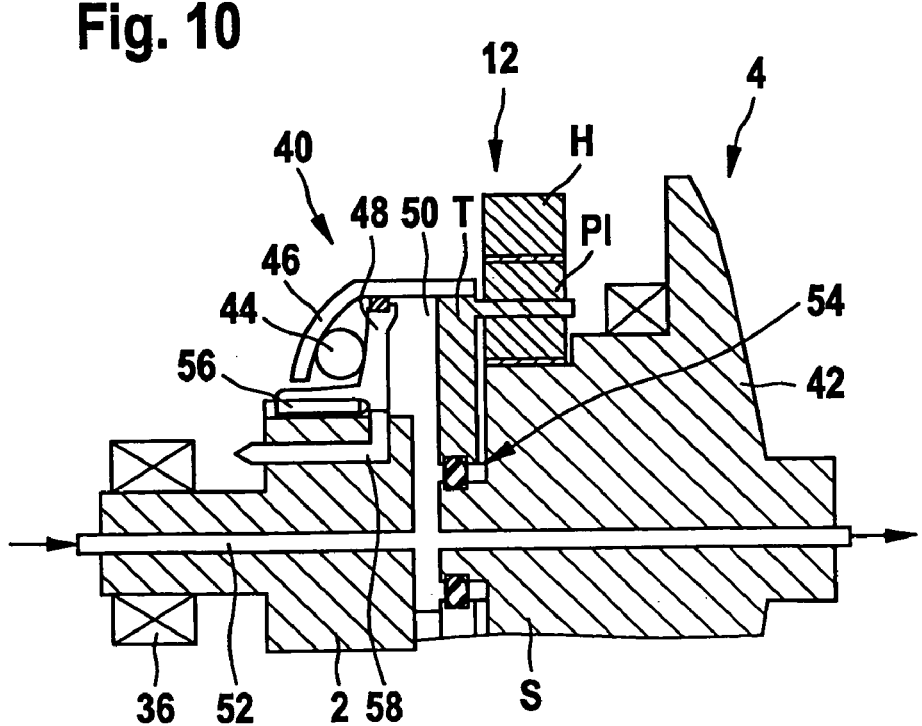

FIG. 10 shows a section through a part of a branched power transmission in accordance with FIG. 7 with which the described problem is solved. The input shaft 2 mounted in the bearings 36 is connected through a torque sensor unit, designated as a whole with 40, with the carrier T of the planetary stage, whose planetary gears PI mesh with the ring gear H and the sun gear S that is non-rotatably connected with the fixed disk 42 of a conical disk pair.

As is known (examples are described in DE 199 57 950 A and DE 42 34 294 A), the torque sensor unit contains balls 44 that are supported on a ramp plate 46 fixedly connected with the carrier T and on a ramp plate 48 that is non-rotatably but axially displaceably connected to the drive shaft 2.

A hydraulic fluid pressurized by a pump is led into a hollow space 50 through a conduit 52 through the drive shaft 2 and the fixed disk 42 from the left in accordance with FIG. 10 (the sealing elements are designated by 54). In accordance with the torque transmitted by the drive shaft 2, the axial position of the ramp plate 48 is changed relative to the drive shaft 2, and with it the outlet cross section of a control opening controlled by the control edge 56 formed on the ramp plate 48, through which the hydraulic fluid escapes from the hollow space 30 through an outlet conduit 58. In that way the pressure of the hydraulic fluid leaving the channel 52 on the right side in accordance with FIG. 10, or both sides, is a function of the torque transmitted by the drive shaft 2. That pressure is conveyed to the displaceable disk that lies opposite to the fixed disk 42 through the distributor transmission by means of a small rotatable tube or sealed by slide ring seals that are not shown, and is used to produce a base contact pressure that is independent of the transmission ratio of the variable speed unit. That pressure that also exists on the left side of FIG. 10 is conveyed from there to the displaceable disk of the other conical disk pair that is not shown in FIG. 10. The base pressure is not sufficient at some transmission ratios and is supplemented by the appropriate admission of hydraulic fluid pressure through additional chambers. The contact pressure controlled by the torque sensor has the advantage that a simple and precisely measurable pressure is available as a function of the transmitted torque.

Based on the required low sensor transmission ratio (bar/Nm), construction methods with comparably steep ramp profiles or large radii are suitable, as they exist anyhow in the direct vicinity of the planets.

In a modified embodiment, the torque sensor unit senses the torque that is led from the planetary transmission to the variable speed unit shaft, and that is at least in one part not identical with the torque transmitted by the endless torque-transmitting means, as torque is also adjusted by the clutches.

The torque sensor can be built up on a connecting shaft of the distributor transmission other than that shown in FIG. 10, so long as the torque of that shaft has a fixed ratio to the drive shaft torque, which is the case in planetary transmissions. The torque sensor can be especially be built on an intermediate shaft (for bridging the axis offset between the conical disk shafts) or on the conical disk shaft that is not coaxial to the distributor transmission, and that is connected to the distributor transmission through an intermediate gear.

Alternatively, it is possible to construct the variable speed unit in such a way that its displaceable disk is closer to the planetary transmission and the pressure conduit is possible by axially shorter bores.

In a further embodiment, the torque transmitted by the drive shaft 2 can be determined in another way, for example by a characteristic field that provides the engine torque as a function of its rotational speed, and provides the position of the power actuator, and can be utilized to produce a base contact pressure.

Figure 11:
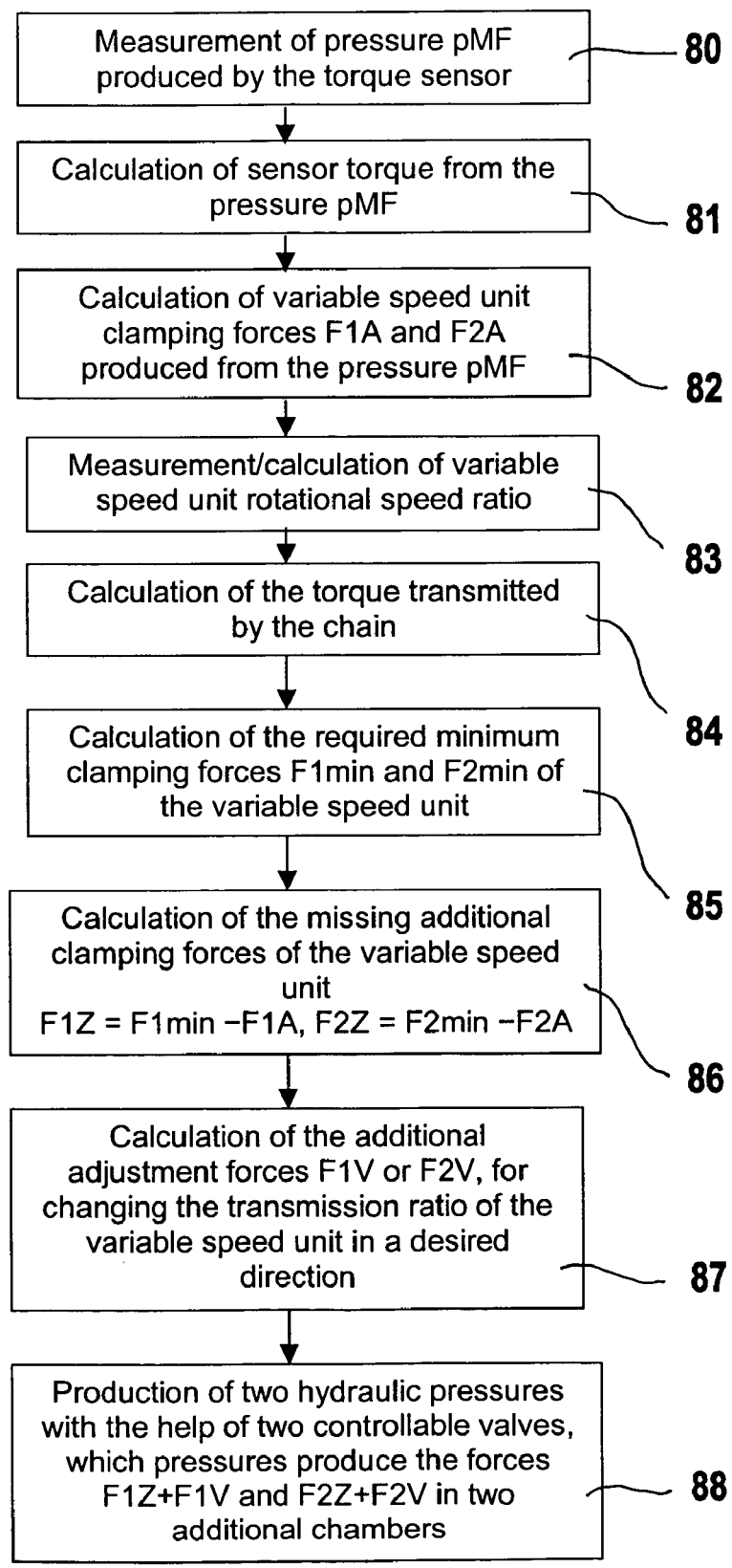

The base contact pressure that is a function of the transmitted torque can be detected and can be utilized for the control of additional pressures that contribute to the total contact pressure between the endless torque-transmitting means and the conical disks. Furthermore, the base contact pressure can be utilized for the control or regulation of the pressures for shifting between the transmission ratio ranges the clutches that are provided. A method to use the measured base contact pressure for completing the necessary contact pressure of the variable speed unit is shown in FIG. 11.

In a first step S1 the pressure is measured. In steps S1 and S2, the directly resulting physical values of sensor torque and base contact pressure are calculated. Moreover, it is a question of simple linear relationships. In a step S3, the rotational speed ratio of the variable speed unit is determined, for example from the rotational speeds detected by the rotational speed sensors of both variable speed unit shafts 14 and 16. In a step S4, the torque transmitted by the chain or the belt is calculated. That torque rises linearly with the sensor torque, wherein the increase is a function of the transmission ratio. A torque produced by an electrical machine that if necessary can be arranged in the transmission is also considered as the chain torque. In the following steps the clamping forces are calculated that are absolutely necessary for a slip-free transmission of the chain torque (S5), or the additional forces still missing (S6). In step 7 a transmission ratio control circuit is considered, as is required, with which the transmission can adapt its transmission ratio to changed driving situations. Step S7 produces so-called adjustment forces in order to change the transmission ratio in a desired way. In a last step S8 the calculated forces are actually applied to the disks of the variable speed unit, in which two valves are electrically controlled and in each case produce a hydraulic pressure. That pressure is conducted through tubes or conduits into appropriate chambers of the displaceable disks of the variable speed unit.

A further problem of the known transmission is the reduction of losses in a stationary motor vehicle. Those losses result in that in that driving situation the transmission anticipates transmitting a torque to the output shaft, by which torque creeping or starting of the motor vehicle is made possible. In the known transmissions, the production of that torque is connected with losses that originate either in the friction clutch or in a converter.

In further developed embodiments of the transmission in accordance with the invention such a torque can be produced with small frictional losses. For that purpose, an electrical machine is connected to the transmission, which can be operated as a generator as well as an additional motor. A further degree of freedom results when that electrical machine is not directly non-rotatably connected to one of the existing output shafts or the drive shaft, but indirectly through a blockable planetary transmission by means of a blocking clutch. In that case, by a slipping or completely disengaged blocking clutch an additional, continuously adjustable degree of freedom of the transmission can result, and the transmission ratio ranges can be enlarged. Consequently, the transmission can be operated as "geared neutral," meaning to make available in a stationary motor vehicle a torque at the output without slipping clutches.

Exemplary embodiments of those further developed transmissions are explained with the help of FIGS. 12, 13, 14, or 22, which in each case show the structures of the exemplary embodiments and their shift diagrams. It is apparent from those shift diagrams that the transmissions make possible additional transmission ratio ranges.

Figure 12:
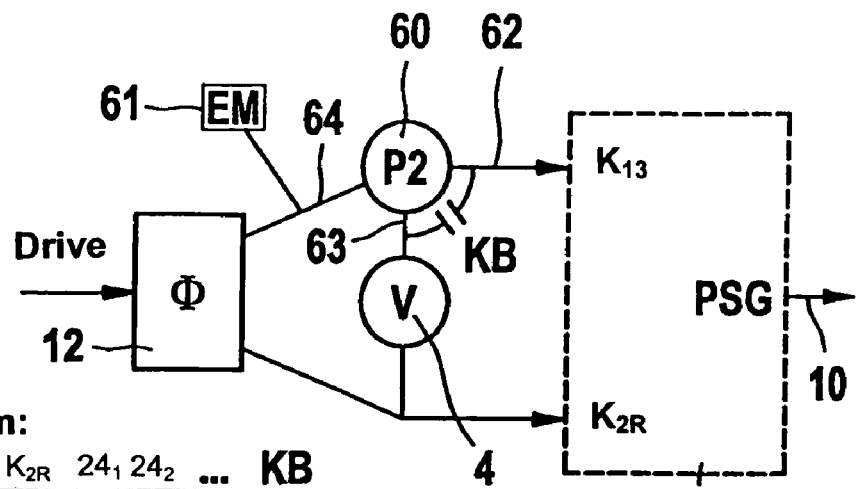

A first embodiment of the transmission with an electrical machine will be more specifically described in the example of the structure in FIG. 12.

The rotor of an electrical machine 61 (EM) is non-rotatably connected with a connecting shaft 64 between the distributor transmission 12 and the additional planetary transmission 60. An output shaft 62 leading to the parallel gearbox 20 is non-rotatably connected with another gear of the planetary transmission 60. The variable speed unit 4 and the planetary transmission 60 are also non-rotatably connected through a variable speed unit shaft 63. A blocking clutch KB connects two shafts of the planetary transmission—without limiting the generality, in the example they are shafts 62 and 63.

When the blocking clutch KB is engaged, the function of the planetary transmission 60 is limited, so that the electrical machine 61 is fixedly connected with the output shaft 62, fixedly connected with the variable speed unit shaft 63 and fixedly connected with shaft 64 of the distributor transmission. The electrical machine is pulled along by the already-described transmission with the ranges I, II, III and R and can thereby produce electrical power or can conversely produce additional mechanical drive power.

As long as the blocking clutch KB is disengaged and the electrical machine 61 assumes the same rotational speed through a suitable application of current, for example in the form of a rotational speed control such as variable speed unit shaft 63, the same rotational speed conditions exist as in an engaged blocking clutch. That condition represents an actively reproducible transmission condition for the condition described below.

As long as the blocking clutch KB is disengaged, the electrical machine 61 can assume a variable rotational speed through the application of a suitable current. Thereby a rotational speed difference results at the output shaft 62, which is connected with output 10 through the parallel gearbox 20 in at least some transmission ratio ranges. Thereby it is possible to even allow the shaft 62 to be stationary, which means that the transmission is operated as "geared neutral" (GN). For that purpose, the electrical machine 61 must rotate and produce energy, for example for charging a battery. A feature of the "geared neutral" is the fact that the variable speed unit 4 rotates and can be adjusted to different transmission ratios. The effect of the transmission ratio in "geared neutral" is that the rotational speed ratio between the engine (not shown) and the electrical machine can be changed. Thereby, the transmission can steplessly comply with a changing electrical power requirement, for example as one result supplementary electrical heating.

Instead of slowing or stopping the shaft 62, it can also be accelerated, which means that a higher vehicle speed is possible, that is, that the transmission has a larger spread. A further feature of the transmission lies in the established fact that with a disengaged blocking clutch KB the rotational speed conditions can be adjusted in such a way that two gears can be engaged simultaneously in the parallel gearbox 20 and the clutches $K_{13}$ and $K_{2R}$ can also be engaged simultaneously. When the gears $24_1$ and $24_2$ are simultaneously engaged, the transmission ratio range designated as I-IIE in the schematic results. The dots in the shift schematic represent possible additional gears or transmission ratio ranges, for example $24_3$, $24_R$, and the like.

Figure 13:
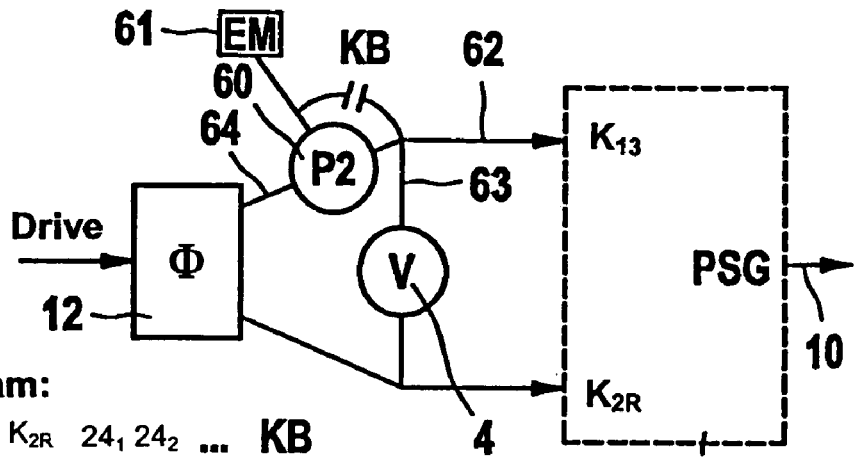

Another embodiment of the transmission with an electrical machine is explained in more detail with the exemplary structure in accordance with FIG. 13.

The rotor of the electrical machine 61 (EM) is non-rotatably connected with one of the shafts of the additional planetary transmission 60. The shaft 62 leading to the parallel gearbox 20 is non-rotatably connected with the variable speed unit shaft 63 as well as with another gear of the planetary transmission 60. The distributor transmission 12 and the planetary transmission 60 are also non-rotatably connected through a shaft 63. A blocking clutch KB connects two of the shafts of the planetary transmission— without limiting the generality, they are in the example the shafts of the electrical machine 61 and the output shaft 63.

When the blocking clutch KB is engaged, the function of the planets is limited insofar as the electrical machine 61 is fixedly connected with the variable speed unit shaft 63 and is fixedly connected with the shaft 64 of the distributor transmission. The electrical machine is pulled along with the already-described transmission with the regions I, II, III, and R and can thereby produce electrical power or on the other hand it can also produce additional mechanical drive power.

So long as the blocking clutch KB is disengaged and the electrical machine 61 assumes the same rotational speed as the variable speed unit shaft 63 through a suitable application of current, for example in the form of a rotational speed control, the same rotational speed conditions exist as if the blocking clutch was engaged. That condition represents an actively reproducible transfer condition for the condition described below.

So long as the blocking clutch KB is disengaged, the electrical machine 61 can assume a variable rotational speed through a suitable application of current. Thereby there results a rotational speed difference relative to the output shaft 62, which is connected through the parallel gearbox 20 in at least some transmission ratio ranges. Thereby it is possible to even allow the shaft 62 to be stationary, which means that the transmission is operated as "geared neutral." For that purpose, the electrical machine 61 must rotate and produce energy, for example for charging a battery. Instead of slowing/stopping the shaft 62, it can also be accelerated, which means that a higher vehicle speed is possible, that is, the transmission has a larger spread.

Figure 14:
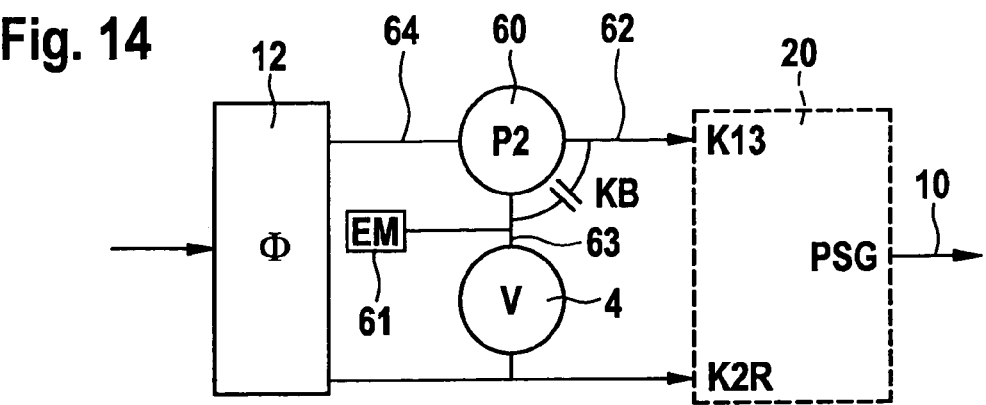

An additional embodiment of the transmission with an electrical machine is shown in FIG. 14. The function is almost identical to the function of the transmission structure shown in FIG. 12, simply the electrical machine is on a different shaft of the additional planetary transmission 60. According to the characteristics of the electrical machine, for example its maximum torque or its maximum rotational speed, the installation on the shaft 63 can be advantageous.

For the operation of a transmission with an electrical machine 61 corresponding with FIGS. 12 to 14, it is advantageous to control the electrical machine as well as the friction clutches and the variable speed unit through a control unit (not shown) in such a way that a torque is produced at the transmission outlet. That torque can be used for creeping or starting.

Figure 15:
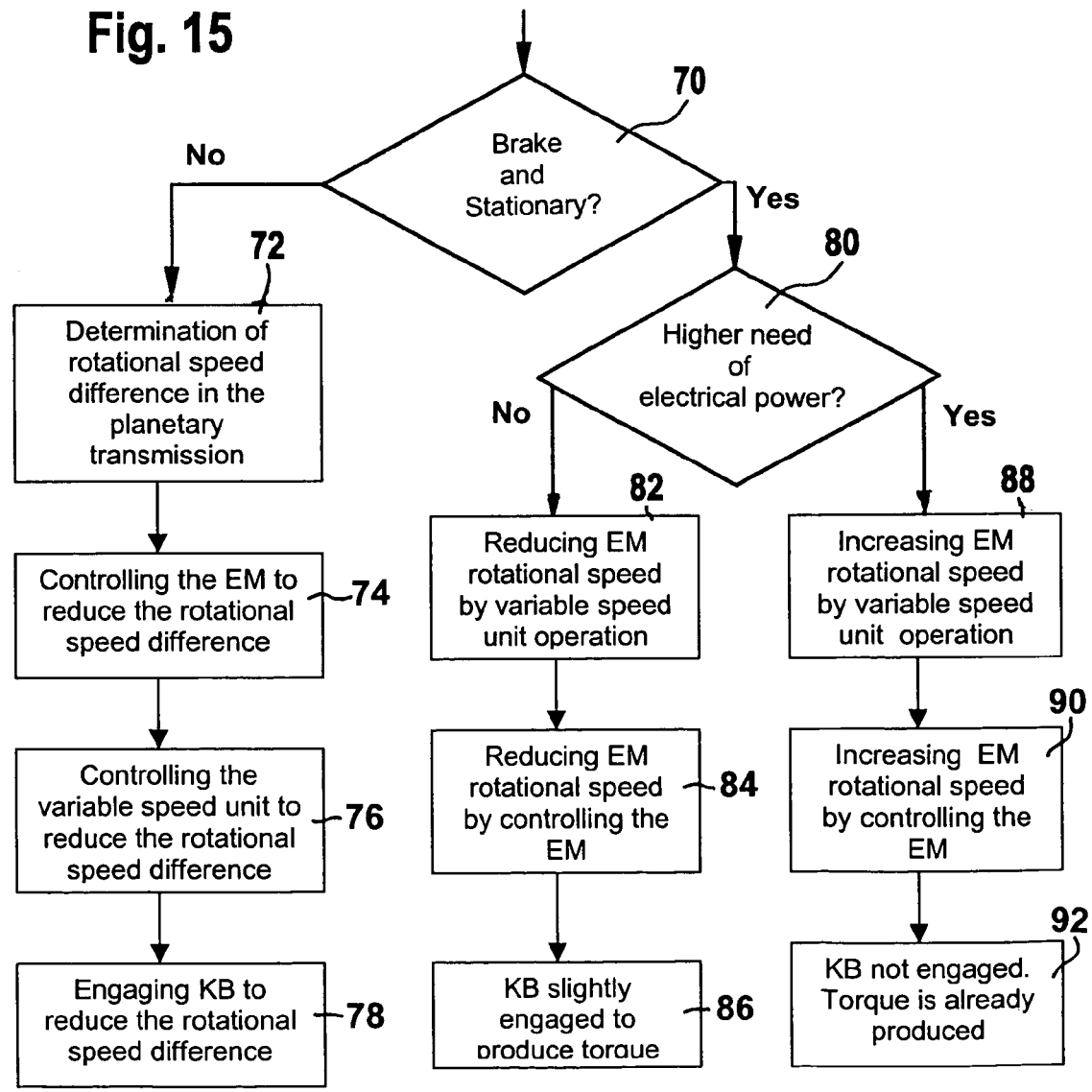

That method is explained as an example with the help of FIG. 15. The parallel gearbox is in region I and clutch K13 is engaged. In a first step 70 it is determined whether the motor vehicle should remain stationary. If that is not the case, the transmission is operated in such a way that it is changed to a driving condition. For that purpose, it is first determined in step 72 how large the rotational speed difference is in the planetary transmission 60 based on measured rotational speed signals. In step 64 the electrical machine 61 is controlled in such a way that the rotational speed difference in the planetary transmission is decreased. Further, in step 76 the variable speed unit 4 is controlled in such a way that the rotational speed difference in the planetary transmission is reduced further. Additionally, in step 78 the blocking clutch KB is engaged in such a way that the rotational speed difference is reduced further. By the reduction of the rotational speed difference in the planetary transmission 60, the rotational speed of the output shaft 62 is accelerated and the motor vehicle starts to move.

When after the decrease discrimination in step 70 the motor vehicle remains stationary, it is determined in step 80 whether there currently exists a higher or lower electrical power requirement. That power requirement can be determined, for example, by the battery charge condition or the switch position for large current utilization devices, like a rear window heater. At low power requirements, the rotational speed of the electrical machine 61 is reduced in steps 82, 84 and 86 so that it generates only little power, through the appropriate operation of the variable speed unit 4, through immediate control of the electrical machine and through insignificant engagement of the blocking clutch KB. When a higher electrical power requirement exists, the rotational speed of the electrical machine or the electrical power it produces will be increased in steps 88, 90 and 92 in that the variable speed unit is appropriately operated, the electrical machine is directly and correspondingly controlled and the blocking clutch KB is not engaged. The electrical power is produced when the internal combustion engine is idling, wherein the torque of the internal combustion engine (not shown) is increased as needed either through its idle speed control or advantageously an appropriate signal is received, so that the power output is increased correspondingly with the increased generator power needed.

Below further advantageous possibilities are explained with the help of FIG. 16 to 22, a transmission with steplessly adjustable transmission ratio also without a parallel gearbox at its output, as it existed in the previously-described embodiments, provided with an electrical machine and therethrough to expand the utilization possibilities of the transmission as well as of the electrical machine.

Figure 16:
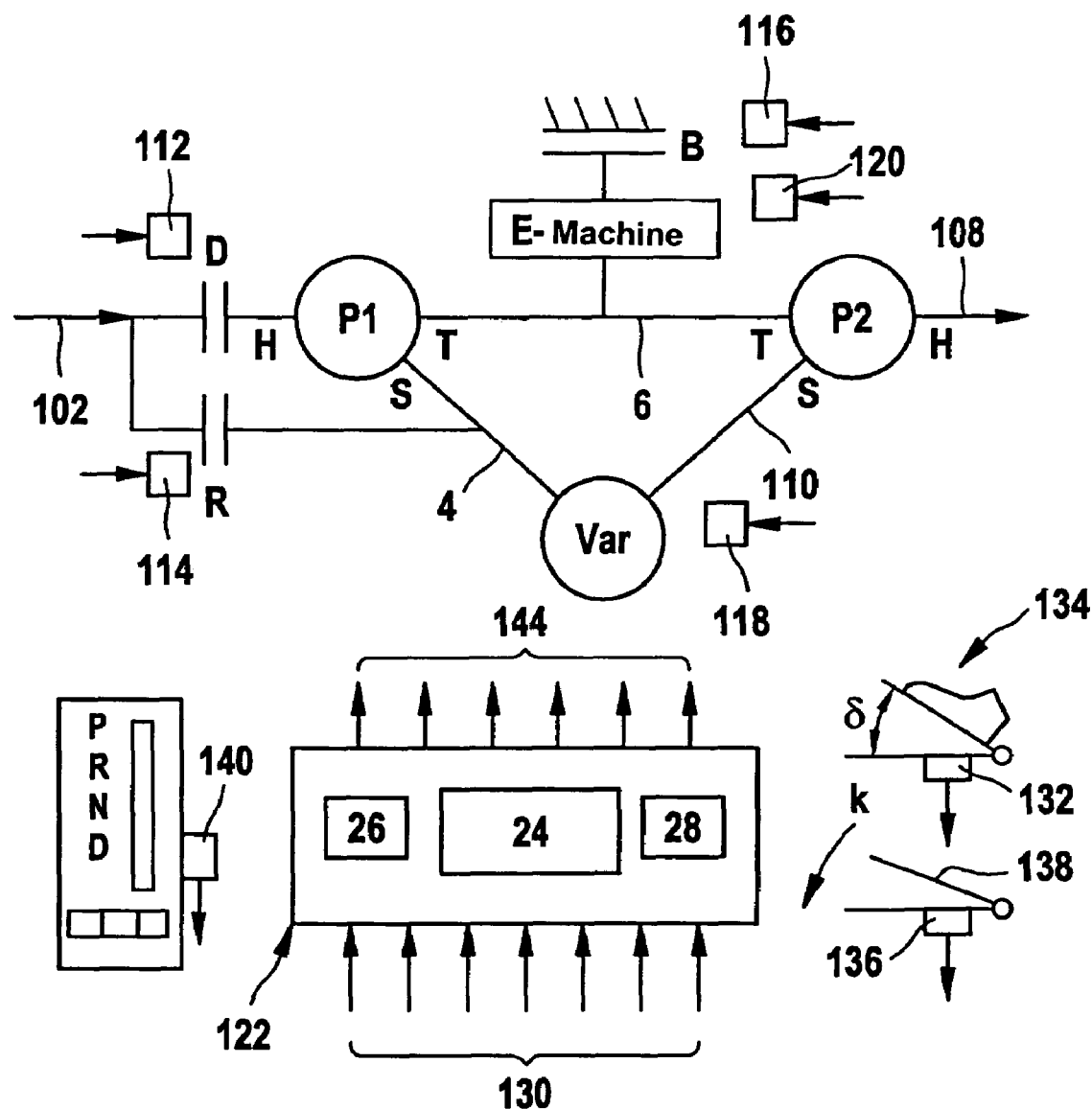

In accordance with FIG. 16, a drive shaft 102 of a motor vehicle drive train driven by a not shown drive engine, preferably an internal combustion engine, is connected with a first planetary transmission P1. A clutch D enables travel in the forward direction. That clutch D can be functionally equivalently installed at the output shaft 108 and then corresponds with the clutch designated as K13 in FIG. 7. The planetary transmission P1 is connected with the input shaft 104 of the variable speed unit Var and through a connecting shaft 106 with a second planetary transmission P2. The connecting shaft can include a functionally equivalent spur gear reduction and then corresponds to the connection of X2 to Y2 in FIG. 7. The planetary transmission P2 drives an output shaft 108 leading to the driven wheels of a motor vehicle. The connecting shaft 106 is non-rotatably connected with an electrical machine whose rotor can be fixed through a brake B.

The output shaft 110 of the variable speed unit Var is connected with the second planetary transmission P2.

In the torque flow direction forward of the clutch D another clutch R is connected with the input shaft 102, by means of which the drive shaft 102 can be non-rotatably connected with the input shaft 104. The clutch R can be functionally equivalently installed at the output shaft 108, and then corresponds to clutch K2R in FIG. 7.

The construction and function of the described components are known and are therefore not individually explained. Each of the planetary transmissions P1 and P2 has in a known way a sun gear that is in rotational engagement with a ring gear through the planet gears supported on a carrier. Each of the illustrated three in- or outputs of the planetary transmissions can be formed by their sun gear, their carrier and their ring gear, whereby both planetary transmissions can be connected in a total of 36 different configurations with their associated shafts.

An advantageous configuration is given in FIG. 16 through the furnishing of the appropriate letters for the sun gear S, the carrier T and the ring gear H. The ring gear H of the first planetary transmission P1 is connected with the clutch D, the sun gear S is non-rotatably connected with the input shaft 104, and the carrier T is connected with the connecting shaft 106, with which the carrier T of the planetary transmission P2 is also connected. The sun gear of the planetary transmission P2 is connected with the output shaft 110 and the ring gear H is connected with the output shaft 108.

The transmission in accordance with the invention can be constructed in many configurations, whereby examples of additional advantageous configurations can be described symbolically as follows:

$AN-H1\ S1-X1\ Y1-P1\ EM-T1-T2\ P2-S2\ AB-H2$
$I1=-2\ I2=-2\ X1/Y1=0.55$ $AN-S1\ H1-X1\ Y1-P1\ EM-T1-S2\ P2-H2\ AB-T2$
$I1=2\ I2=-2\ X1/Y1=0.55$ $AN-S1\ T1-X1\ Y1-P1\ EM-H1-S2\ P2-H2\ AB-T2$
$I1=-2\ I2=-2\ X1/Y1=0.55$ $AN-S1\ T1-X1\ Y1-P1\ EM-H1-H2\ P2-S2\ AB-T2$
$I1=-2\ I2=-2\ X1/Y1=0.55$ $AN-H1\ T1-X1\ Y1-P1\ EM-S1-H2\ P2-S2\ AB-T2$
$I1=-2\ I2=-2\ X1/Y1=0.55$ $AN-T1\ H1-P1\ EM-S1-S2\ P2-X1\ Y1-H2\ AB-T2$
$I1=-2.5\ I2=-2.5\ X1/Y1=1.5$ $AN-T1\ S1-P1\ EM-H1-T2\ P2-X1\ Y1-S2\ AB-H2$
$I1=-2.5\ I2=-2.5\ X1/Y1=1.5$ $AN-T1\ S1-P1\ EM-H1-T2\ P2-X1\ Y1-S2\ AB-H2$
$I1=-2\ I2=-2.5\ X1/Y1=-1.1$ $AN-H1\ T1-P1\ EM-S1-S2\ P2-H2\ AB-T2\ I1=-2.5$
$I2=-2.5$

In this description, S1 and S2 stand for the sun gears of the planetary transmissions 1 and 2, T1 and T2 for the planet carriers, H1 and H2 for the ring gears, P1 and P2 for the disk sets of the variable speed unit, as well as AN for input, AB for output and EM for the electrical machine. Minus signs symbolize that the appropriate masses are non-rotatably connected with each other. The numerical values provided are exemplary transmission ratios of the planetary transmissions or spur gear stages.

Also preferred, both planetary transmissions are designed as a reduced planetary transmission coupling, that thereby leads to that the connecting shaft does not at all have to be designed as "shaft." That is possible, for example, when the connecting shaft represents the planet carrier of both planetary transmissions, or when the connecting shaft represents a wide sun gear that meshes equally with two planets located next to each other on both of the planetary transmissions.

Actuators 112, 114, 116 and 118 are provided for the actuation of the clutches D and R, the brake B and the variable speed unit Var. The operation of the electrical machine is controlled by a control unit 120. The construction and function of the actuators and of the control device are known.

For the control of the actuators and the control unit 120, a control device 122 is provided with at least one microprocessor 124 and accompanying program memory 126 and data memory 128.

Input variables of the control device 122 are provided with not shown sensors to detect the load and rotational speed of the not shown internal combustion engine, the rotational speed of the output shaft, the rotational speeds of the shafts 104, 106 and 110, as well as a sensor 133 for detecting the position of a gas pedal 134, a sensor 136 for detecting the position of a brake pedal 138 or the force K, with which the brake pedal is actuated, a sensor 140 for detecting the condition of a manually actuatable actuation unit 142 for the selection of certain transmission ratios of the transmission or transmission programs. Individual ones of the named sensors could be missing. Additional sensors can be provided.

Outputs 144 of the control device 122 are connected with the above-mentioned actuators and the control unit 120 as well as additional actuators, such as, for example, a power actuator of the internal combustion engine.

The construction and function of the above-mentioned components are known and are therefore not individually explained. The control device 122 can be divided into different devices, for example, a control device for the engine and a control device for the transmission that can be connected together through a bus. Further, the actuators or their actuating elements can be provided with sensors with which the individual positions can be reported back to the control device so that a precise actuation is possible.

The described configuration of the transmission in accordance with the invention, by which the electrical machine is located in the "interior" of the transmission formed by the planetary transmissions P1 and P2 and the variable speed unit Var, has various useful operational positions and functions. For the standard planetary transmission ratios from −1.5 to −2.5 there arise ordinary transmission ratio regions, which can be further matched to the respective requirements through a downstream transmission ratio stage.

For an overall understanding of the functions of a transmission in accordance with the invention, a representation in the form of a spherical diagram is appropriate based on the numerous degrees of freedom.

Figure 17:
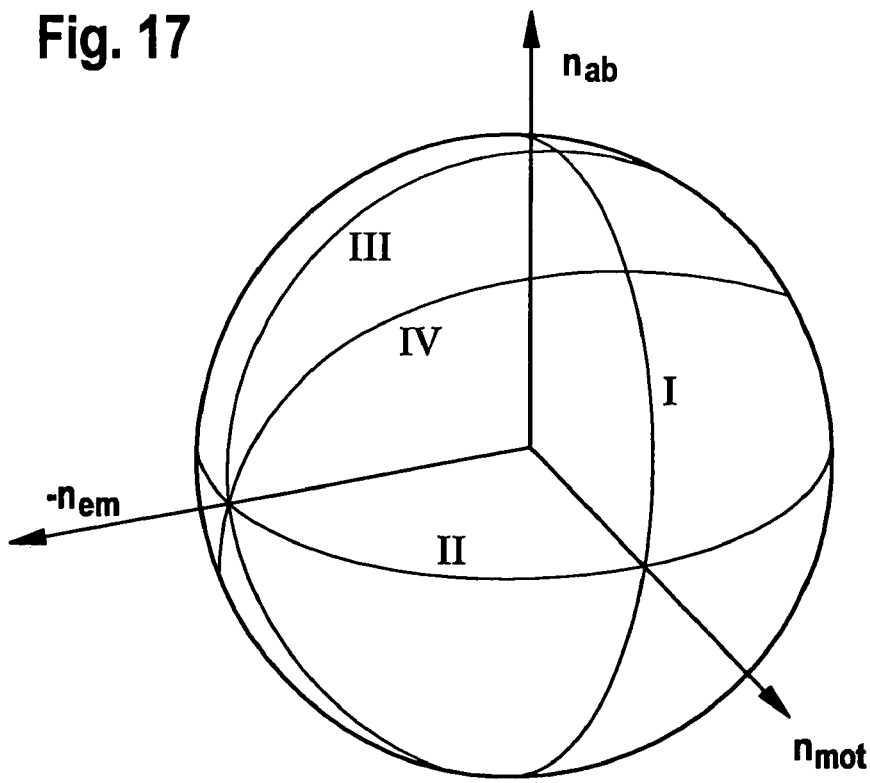
Figure 18:
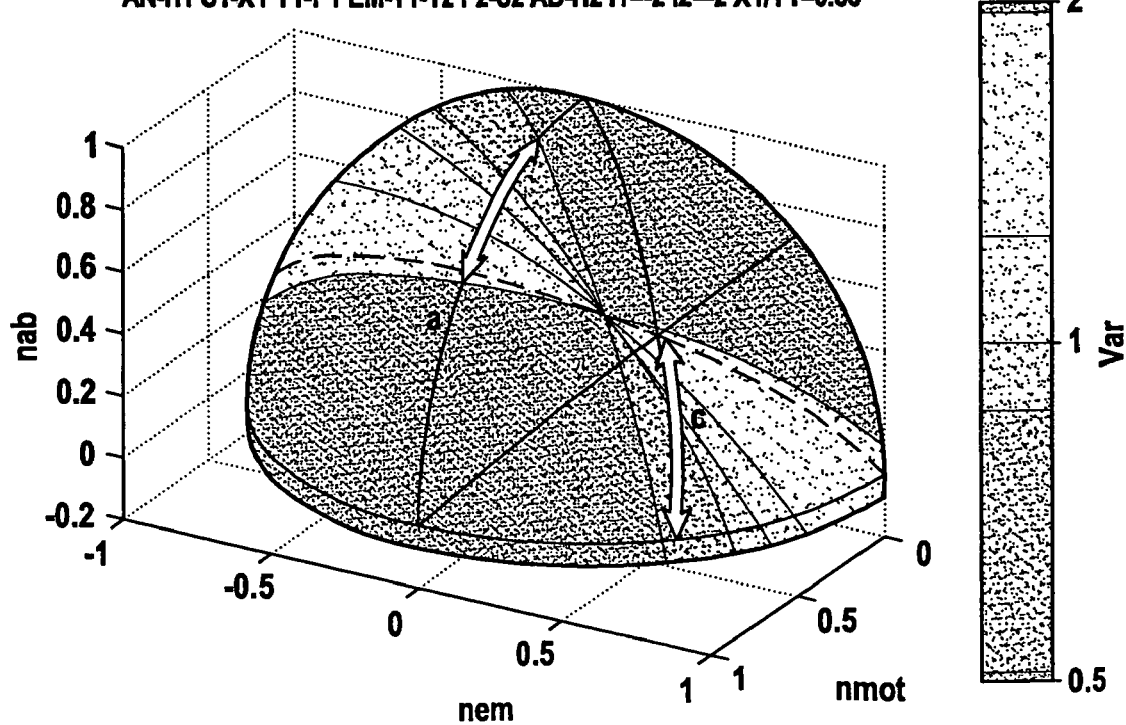

One such sphere is delineated in FIG. 17 with some accentuated regions. The points on the unitary spherical surface around its origin have characteristic coordinates, such namely engine rotational speed $n_{mot}$, electrical machine rotational speed $n_{em}$ and output rotational speed $n_{ab}$. Each point on the surface can also be described by two or three polar angles $n_{mot}/n_{ab}=i_{ges}$; $n_{mot}/n_{em}=i_{quer}$; $n_{em}/n_{ab}=i_{em}$. The transmission function can be represented by establishing the variable speed unit transmission ratio $i_{var}$ on each point of the spherical surface (for example as a contour line), which to travel that point must be adjusted. When not all points on the spherical surface are movable (there is, for example, a largest and a smallest possible variable speed unit transmission ratio), the use boundaries are likewise held on the sphere. FIG. 3 provides an example of one variable speed unit transmission ratio shown on a spherical diagram. A simpler representation than in spherical diagrams is only possible with difficulty, as the transmission equation combines four quantities $n_{mot}$, $n_{em}$, $n_{ab}$ and $i_{var}$ together and can yet generally only be presented three dimensionally based on the linearity of the rotational speeds.

In FIG. 17 the line I designates operating points at which the electrical machine is stationary or is securely braked. The various points on the line differ from each other through their drive- or output rotational speeds, that means also the transmission ratio $i_{ges}$ that is used for driving. II indicates operating points at which the vehicle is standing (geared-neutral) and the engine and the electrical machine are in rotational speed ratio $i_{quer}$. III designates operating points at which the internal combustion engine is stopped and can be driven by means of, for example, the electrical machine, whereby different transmission ratios $i_{em}$ are possible. IV designates operating points of constant engine overall transmission ratio $i_{ges}$. The operating points produce circles whose different points differ from each other by the rotational speed of the electrical machine.

Below some characteristics of exemplary or similar configurations are explained with the help of FIGS. 17 to 22.

D-Driving region with a secured braked electrical machine

The clutch R (reverse clutch) is disengaged and the clutch D (forward clutch) is engaged. The brake B is engaged which means that the connecting shaft 6 is stopped. In that way the driveable region is identified by "a" in FIG. 18. It has a minimum and maximum possible transmission ratio.

The first planetary transmission P1 operates as a reversing input transmission ratio (I=−1/1.5). After a reduction gear transmission ratio not shown in FIG. 16, moderately slowly that is moreover appropriate because the axial offset, the variable speed unit Var follows and thereafter through an after-gear the second planetary gear P2 as a reversing output transmission ratio to the output shaft 108

The match to the motorization (for example a slowly rotating diesel engine or a quickly rotating gasoline engine) can take place through the planetary transmission and/or the reduction gear/after gear.

Reverse driving region with a securely braked electrical machine

With a disengaged clutch D and an engaged clutch R the variable speed unit Var is directly driven by the input shaft 102. The reversal takes place through the planetary transmission P2.

Branched Driving Region

With a disengaged brake B a load division takes place through the blocked planetary transmission P1. The blockage of the planetary transmission 1 can take place, for example, through the simultaneous actuation of the clutches D and R. The planetary transmission P2 forms a summing transmission. The region that can be driven that way is identified by in FIG. 18 by "c" and the driving region here moreover has a minimum and maximum transmission ratio that covers another area in FIG. 18 than the driving area with a securely braked electrical machine.

Alternatively, a blockage of planetary transmission 2 can be provided with the help of a clutch. That makes possible operation in another power branch region that corresponds to the other angle-bisecting arc that is not identified by.

Generator Function of the Electrical Machine at Standstill-Creeping and Standstill-Displacement The buildup of a creeping torque at the clutch D results from creep forward at standstill in order to set a torque at the output shaft 10 that operates against the foot brake. When slippage is allowed at the brake B, the slippage existing at the clutch D can be shifted to slippage at the brake B if the creeping torque is unchanged, which means that the clutch B can be engaged. In that situation, the possibility exists to adjust the slippage at the brake B either directly through its actuation or through the generator torque of the electrical machine. When the creeping torque takes place exclusively through the generator torque of the electrical machine, a power flow takes place from the internal combustion engine to the generator, whereby the output shaft 108 serves as the support and maintains the creeping torque.

Figure 20:
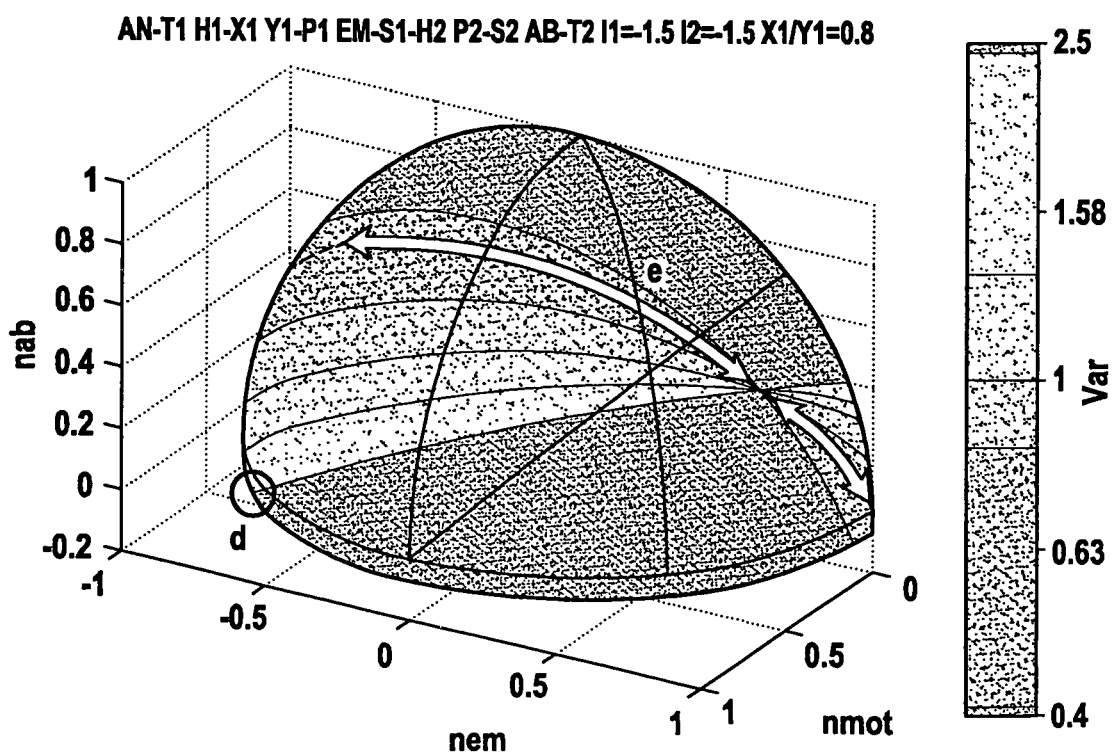

That operating region is identified by "d" in FIG. 20.

In that condition, the variable speed unit Var also rotates, so that its transmission ratio can be adjusted. Therewith it is possible while the motor vehicle is stationary to adjust the variable speed unit transmission ratio, which is, for example, advantageous in a preceding ABS braking method in order to shift back to the starting transmission ratio.

Free Variable Speed Unit Rotational Speed Selection During Driving Operation

In a special variable speed unit transmission ratio the described transmission structure has the characteristic that the operating transmission ratio between the input shaft 102 and the output shaft 108, which means that the transmission ratio of the overall transmission is independent of the rotational speed of the connecting shaft 106, which means the rotational speed of the electrical machine. In FIG. 20, the driveable points at that transmission ratio of the transmission are identified by "e." In the corresponding transmission ratio of the variable speed unit Var, no support of the transmission through the brake B takes place. The electrical machine is in that way "logically" decoupled from the remaining transmission, which means that it is possible to drive with that transmission ratio and to simultaneously adjust the rotational speed of the electrical machine on suitable grounds through control unit 120. The rotational speed of the electrical machine is coupled through the planetary transmission with the rotational speed of the variable speed unit, which means that in the case of a belt-driven conical pulley transmission with the rotational speed of its conical disk pairs it will maintain its rotational speed ratio. Therewith the variable speed unit rotational speed can be lowered, whereby the load diminishes or the operating life of the endless torque-transmitting means, for example a plate-link chain, is increased. In the described transmission structure, the transmission ratio of the variable speed unit or the overall transmission, by which the rotational speed of the connecting shaft 106 does influence the transmission ratio, lies close to the highest gear often utilized on highways, therefore in a region relevant to chain deterioration.

Another advantage of the above-described operation of the transmission with a reduced variable speed unit rotational speed lies in the fact that the loss of power in the transmission is decreased, and that a part of the saved losses is released as generated electrical power by the electrical machine. The transmission has an "inner urge" to allow the loss-rich variable speed unit to rotate slower and thereby allow the connecting shaft to rotate faster.

Basically, the variable speed unit rotational speed can be influenced in all transmission ratios in a transmission in accordance with the invention, whereby it can then be necessary to produce larger electrical machine torques in order to replace the support of the brake B.

Increase of the Spread

Figure 19:
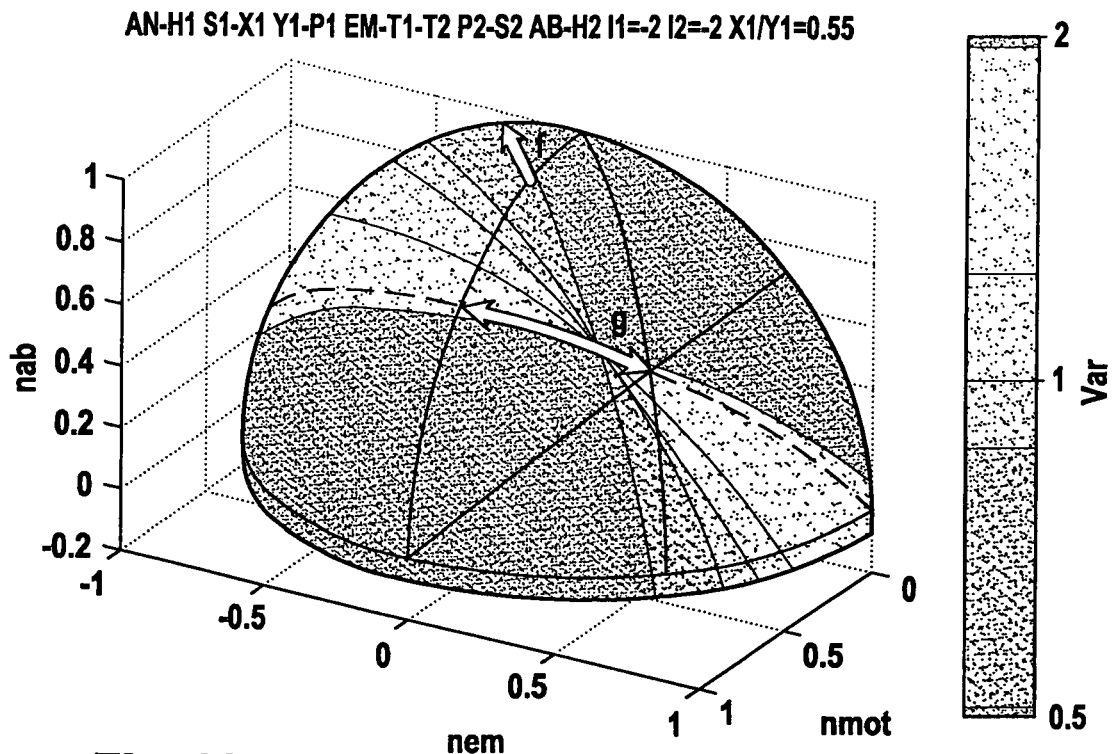

The input rotational speed of a transmission with a given output rotational speed can be changed within a limited range through the rotational speed of the electrical machine, which appears to the driver of a motor vehicle to be similar to a larger spread. The operating points causing that effect are indicated in FIG. 19 as "f". Because the smallest transmission ratio is used as a rule in deceleration, in this case no active acceleration of the electrical machine is required, but the vehicle itself drives the internal combustion engine and the electrical machine. The electrical machine therefore simultaneously increases the spread and thereby operates in the generator mode. A similar expansion of the spread is possible in the starting transmission ratios.

The Electrical-Machine-Led Region Change

The transmission in accordance with the invention can be constructed in a known way by means of at least one additional clutch as a transmission with several transmission ratio ranges with a continuously adjustable transmission ratio. The transmission in FIG. 7 especially represents such a transmission. A region change point or a transmission ratio change point is then determined, so that the overall transmission ratio of the transmission and the transmission ratio of the variable speed unit are the same before and after shifting the clutch(es). In the transmission in accordance with the invention, the electrical machine can be utilized to perform the region change. Such a region change corresponds to the transition identified by "g" in FIG. 19. Through the regulation of the electrical machine rotational speed, the region change can be controlled more exactly than is possible with a region change controlled by the clutches. Additionally, power is always changed into friction in a region change controlled by clutches, whose friction power can be at least partly compensated for through the use of the electrical machine or can also be increased.

The region change can also move away from the actual region change point as a new type of freedom, whereby the stepless region change is possible at such a region change point without slippage of the clutch. Thereby, the problems of conventional branched power transmissions with shiftable transmission ration regions can be solved in transmissions in accordance with the invention that lie in that the shift results in the immediate vicinity of the shift point, wherein a high adjustment, dynamic, fast and precise clutch actuations, and complex compensation of the rotating masses are required, or a slipping transition takes place outside of the region change point, for which a difficult slippage gradient regulation is necessary to secure sufficient position comfort, the clutches must be cooled, and measures are needed to prevent improper use.

Free Recuperation Selection

For each driving condition defined by the rotational speeds of the input shaft 102 and the output shaft 108, there exist several steplessly adjustable operational parameters of the transmission, such as the transmission ratio of the variable speed unit Var and the rotational speed of the electrical machine. It is therefore possible, and "invisible" from the outside, to increase, for example, the rotational speed of the electrical machine during deceleration through the adjustment of the variable speed unit and thereby to increase the energy recovery. That process can be controlled through the force K, with which the driver operates the brake pedal. It is further possible to maintain a consumption-favorable rotational speed of the internal combustion engine through a marginal change in the power demand by the driver, or to maintain a consumption-favorable operating point, and to control the power difference by the electrical machine. That represents an advantage in contrast to conventional generators because the generation can take place precisely at consumption-favorable operating points of the internal combustion engine.

Engine Start in P

In order to start the internal combustion engine in the position P of the transmission, it is possible with a transmission in accordance with the invention to let the electrical machine turn on until the hydraulics work, that supply with power especially the actuators 112, 114, 116, and 118. A not shown hydraulic pump can be driven, for example, by two freewheels, alternatively from the electrical machine or the internal combustion engine. When the electrical machine runs, the internal combustion engine can be started through the engagement of the clutch D or the engagement of both clutches D and R. The engagement process accompanying the internal combustion engine can also take place at a clutch between the electrical machine and the connecting shaft if the transmission has a structure as shown in FIG. 21.

The non-rotatable connection of the electrical machine with the connecting shaft can be fixed in the simplest of cases (the rotor is directly on the connecting shaft) or with the use of a gear reduction (the rotor meshes with the connecting shaft through a gear) or also by using a shiftable spur gear reduction (the rotor meshes with the connecting shaft through two gears, of which one is shifted by means of a claw clutch) or also by using a shiftable planetary reduction (for example, the rotor rotates through a blockable planetary transmission directly or in an unblocked planetary transmission geared with the connecting shaft). Those two further developed modifications are shown in FIG. 21.

Figure 21:
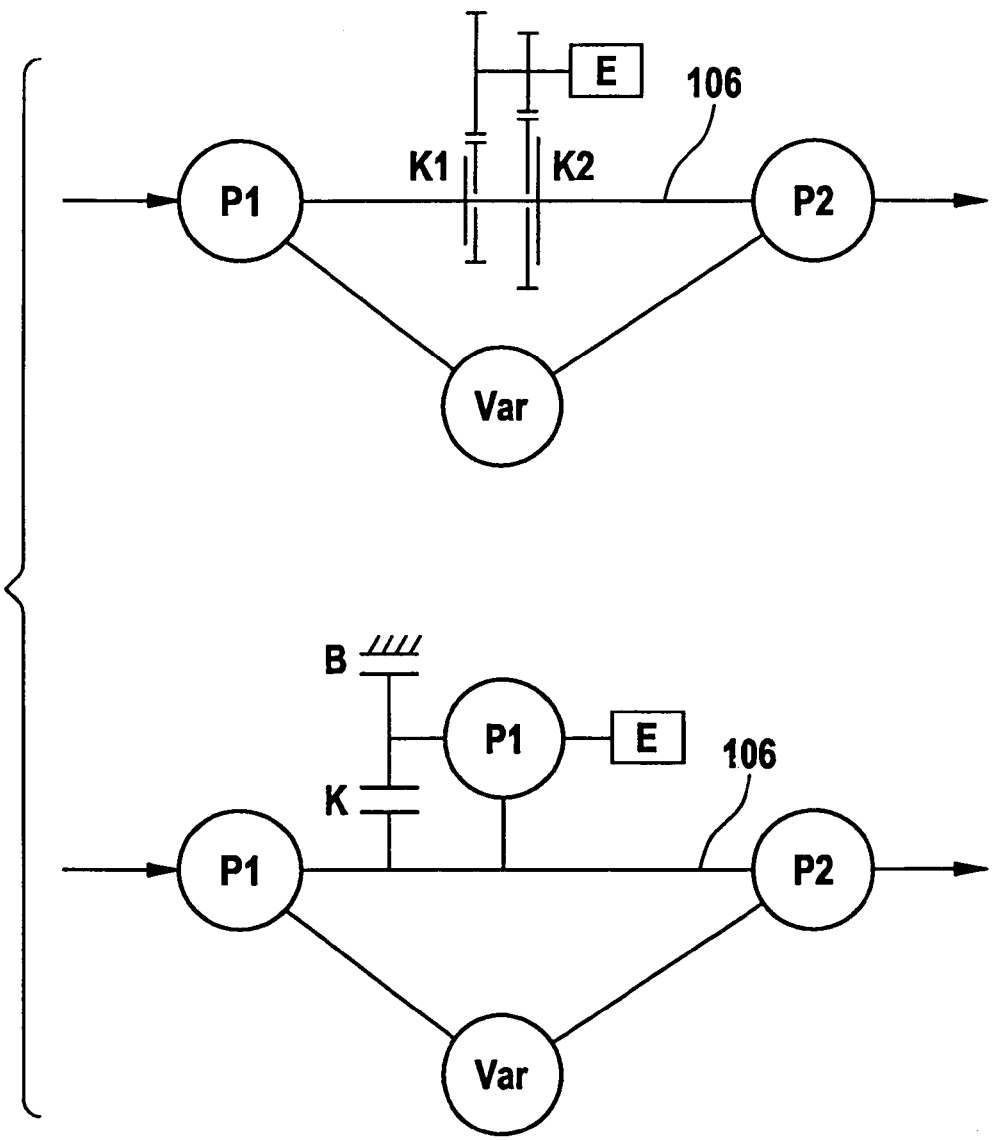
Figure 22:
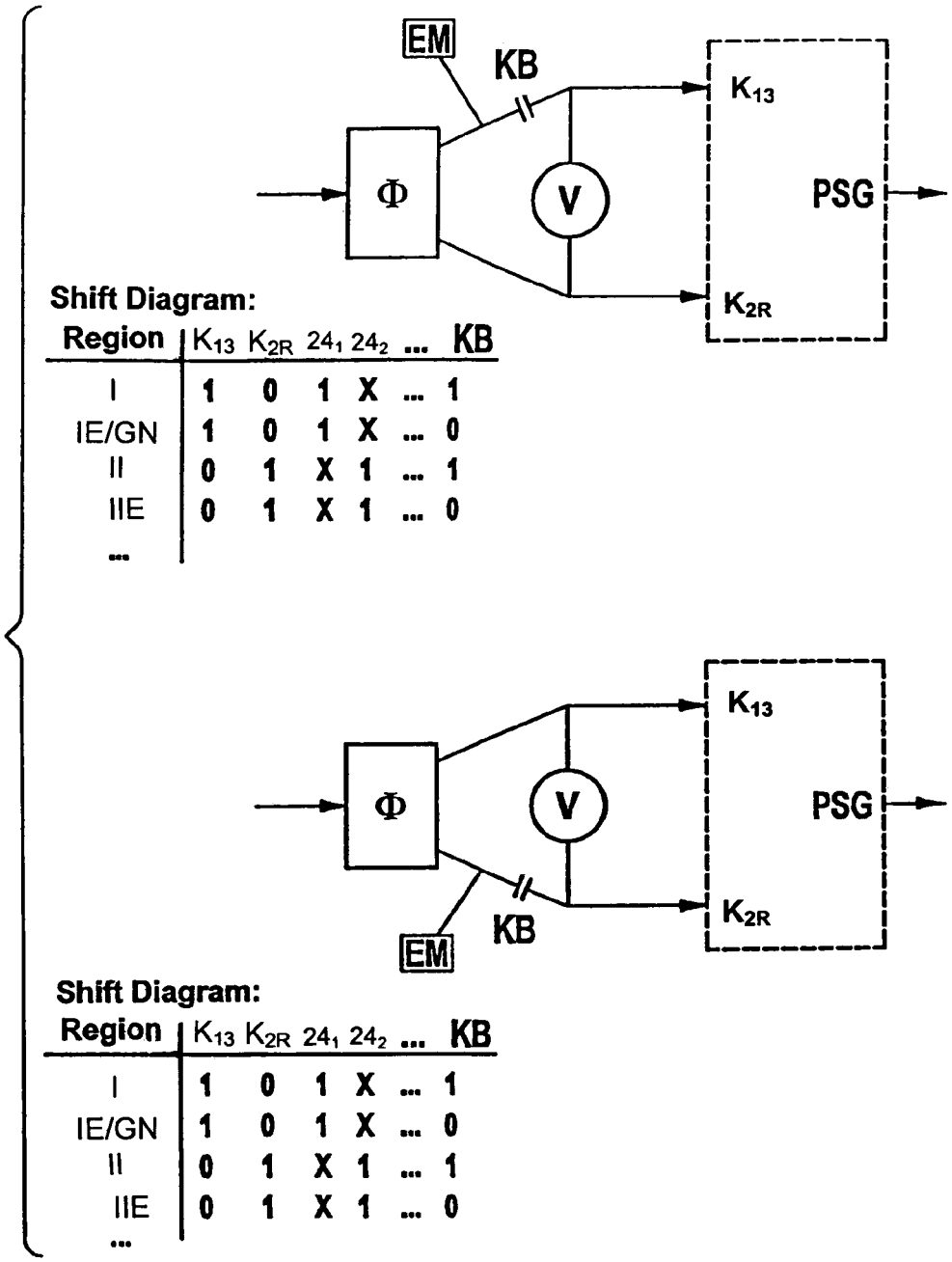

In the two embodiments shown in FIG. 21 of the transmission in accordance with the invention, in each case two friction elements (clutches K or brakes B) are provided, with which four conditions can be realized.

A: Electrical machine and connecting shaft 106 are both securely braked;

B: Electrical machine and connecting shaft 106 are both freely rotatable independently of each other;

C: Electrical machine and connecting shaft are in a first transmission ratio but are rotatable together and D: Electrical machine and connecting shaft 6 are in a second transmission ratio (with other values and/or other signs) but are rotatable together.

The illustrated transmission can be modified in many ways, wherein a simple design with few components can be attained in a symmetrical connection of the planetary transmissions with the variable speed unit and the electrical machine, as well as with identical planetary transmissions.

What is claimed is:

1. A branched power transmission including several transmission ratio ranges, each transmission ratio range having a steplessly adjustable transmission ratio, said transmission comprising: a drive shaft for non-rotatable connection with an engine; a distributor transmission connected with the drive shaft and including first and second distributor transmission outputs, wherein the first distributor transmission output is non-rotatably connected with a first driven shaft of a variable speed unit and the second distributor transmission output is connected to a second driven shaft of the variable speed unit through a gear set; a parallel shaft gearbox having a pair of input shafts coupled through respective clutches with respective ones of the driven shafts of the variable speed unit, and having a gearbox output shaft that forms a branched power transmission output shaft; wherein the branched power transmission includes at least two transmission ratio ranges that are provided by gears carried by each input shaft of the parallel shaft gearbox and that are operatively connected with the branched power transmission output shaft.

2. A branched power transmission in accordance with claim 1, wherein the parallel shaft gearbox includes a shift actuator formed as one of a controller drum for actuating all shift sleeves of the parallel gearbox, a rotary slide actuator, and several sliding sleeves.

3. A branched power transmission in accordance with claim 1, wherein the parallel shaft gearbox input shafts are selectively driven through the respective clutches that are connected with the respective driven shafts of the variable speed unit through at least one respective gear set, wherein a reverse gear is formed by a gear that is non-rotatably connected with one of the input shafts and meshes with another gear that is non-rotatably connected with the gearbox output shaft.

4. A branched power transmission in accordance with claim 1, wherein the parallel shaft gearbox input shafts are selectively driven through the respective clutches and are operatively connected with the gearbox output shaft through at least one respective gear set, wherein a reverse gear is formed by a gear non-rotatably connected with one of the input shafts through one of the respective clutches associated with the one input shaft and that is engaged, and the gear meshes with an additional gear that is non-rotatably connected with the other input shaft, wherein the respective clutch associated with the other input shaft is disengaged, and which the other input shaft is operatively connected with the gearbox output shaft through a set of forward gears.

5. A branched power transmission in accordance with claim 1, wherein the distributor transmission includes a planetary transmission.

6. A branched power transmission in accordance with claim 5, wherein the planetary transmission is a positive transmission including a planet carrier having planet gears with external teeth.

7. A branched power transmission in accordance with claim 1, wherein transmission ratio ranges I and III are shifted through the engagement of one clutch and changing a gear engagement between one of the input shafts of the parallel shaft gearbox and the gearbox output shaft, and transmission ratio ranges II and R are shifted through the engagement of the other clutch and changing a gear engagement between the other input shaft of the parallel shaft gearbox and the gearbox output shaft.

8. A branched power transmission in accordance with claim 7, wherein the output shaft of the parallel shaft gearbox includes at least one of a gear for the transmission ratio ranges I and R and a gear for the transmission ratio ranges II and III.

9. A branched power transmission in accordance with claim 7, wherein the parallel shaft gearbox includes reciprocal transmission ratios having values of about 2, about 1, and about ½.

10. A method for operating a branched power transmission in accordance with claim 1, including the step of shifting the parallel shaft gearbox into a new transmission ratio range before a corresponding clutch changeover.

11. A method for operating a branched power transmission in accordance with claim 10, wherein when a transmission selector lever is in position R, the step of maintaining transmission ratio range I engaged in the parallel gearbox.

12. A method for operating a branched power transmission in accordance with claim 10, wherein when a motor vehicle that includes the transmission is stationary and a transmission selector lever is in a neutral position, the steps of disengaging both of the respective clutches of gearbox and engaging the transmission ratio ranges I and R.

13. A branched power drive with several transmission ratio ranges with steplessly adjustable transmission ratios comprising:
  a drive shaft for non-rotatable connection with an engine, which drive shaft is operatively connected with a pair of shafts of a variable speed unit through a distributor transmission,
  at least two clutches with which respective ones of the pair of shafts of the variable speed unit are selectively coupled with the drive shaft through the distributor transmission,
  and a torque sensor unit for detecting an effective torque transmitted by the drive shaft to at least one shaft of the pair of shafts of the variable speed unit that are connected to the distributor transmission, and for controlling an effective basic contact pressure applied to at least one displaceable disk of a disk pair included in the variable speed unit.

* * * * *